US007167924B1

(12) United States Patent
Symonds et al.

(10) Patent No.: US 7,167,924 B1
(45) Date of Patent: *Jan. 23, 2007

(54) FINANCIAL TRANSACTION PROCESSING SYSTEM AND METHOD

(75) Inventors: Robert D. Symonds, Novelty, OH (US); Irek Singer, Mississauga (CA); Peter St. George, Willowdale (CA); Robert Bradley Gill, Hamilton (CA)

(73) Assignee: Diebold, Incorporated, North Canton, OH (US)

( * ) Notice: Subject to any disclaimer, the term of this patent is extended or adjusted under 35 U.S.C. 154(b) by 814 days.

This patent is subject to a terminal disclaimer.

(21) Appl. No.: 09/867,183

(22) Filed: May 29, 2001

Related U.S. Application Data

(62) Division of application No. 09/483,104, filed on Jan. 14, 2000, which is a division of application No. 08/813,510, filed on Mar. 7, 1997, now Pat. No. 6,039,245.

(60) Provisional application No. 60/019,544, filed on Jun. 10, 1996, provisional application No. 60/021,871, filed on Jul. 17, 1996, provisional application No. 60/025,266, filed on Sep. 17, 1996.

(51) Int. Cl.
*G06F 15/16* (2006.01)
*G06Q 40/00* (2006.01)
(52) U.S. Cl. .................. 709/246; 709/206; 705/43
(58) Field of Classification Search .................. 705/45; 707/101; 709/246, 249, 206; 713/181; 714/55
See application file for complete search history.

(56) References Cited

U.S. PATENT DOCUMENTS

| 4,077,011 A | 2/1978 | Mathis |
| 4,161,781 A | 7/1979 | Hildebrandt et al. |
| 4,654,654 A | 3/1987 | Butler et al. |
| 4,694,397 A | 9/1987 | Grant et al. |

(Continued)

FOREIGN PATENT DOCUMENTS

JP          59-105739          6/1984

(Continued)

*Primary Examiner*—Patrice Winder
(74) *Attorney, Agent, or Firm*—Ralph E. Jocke; Christopher L. Parmelee; Walker & Jocke LPA

(57) ABSTRACT

A financial transaction processing system (10) enables processing transactions from various types of card activated terminal devices (12) which communicate using a variety of electronic message formats. The transaction processing system may operate to authorize transactions internally using information stored in a relational database (32) or may communicate with external authorization systems (18). The transaction processing system includes among its software components message gateway routers (MGRs) (24, 164) which operate using information stored in the relational database to convert messages from a variety of external message formats used by the external devices and authorization systems, to a common internal message format used within the system. The system further uses database information to internally route messages to message processing programs (MPPs) (108, 138) which process messages and generate messages to the external devices and authorization systems. The MGR also converts the outgoing messages from the internal message format to the external message formats which can be interpreted by the external devices and systems to which the messages are directed.

36 Claims, 29 Drawing Sheets

U.S. PATENT DOCUMENTS

| | | | |
|---|---|---|---|
| 4,727,243 A | | 2/1988 | Savar |
| 4,855,905 A | | 8/1989 | Estrada et al. |
| 4,918,728 A | * | 4/1990 | Matyas et al. ............... 713/181 |
| 5,119,465 A | | 6/1992 | Jack et al. |
| 5,239,662 A | * | 8/1993 | Danielson et al. .......... 709/246 |
| 5,258,604 A | | 11/1993 | Behrens et al. |
| 5,265,033 A | * | 11/1993 | Vajk et al. .................. 709/206 |
| 5,339,421 A | | 8/1994 | Housel, III |
| 5,384,766 A | | 1/1995 | Yamato et al. |
| 5,457,305 A | * | 10/1995 | Akel et al. .................... 705/43 |
| 5,561,770 A | | 10/1996 | De Bruijn et al. |
| 5,577,237 A | * | 11/1996 | Lin .............................. 714/55 |
| 5,694,580 A | | 12/1997 | Narita et al. |
| 5,706,434 A | | 1/1998 | Kremen et al. |
| 5,715,397 A | | 2/1998 | Ogawa et al. |
| 5,734,651 A | * | 3/1998 | Blakeley et al. ............ 370/392 |
| 5,826,017 A | | 10/1998 | Holzmann |
| 5,845,283 A | * | 12/1998 | Williams et al. ............ 707/101 |

FOREIGN PATENT DOCUMENTS

| | | |
|---|---|---|
| JP | 61-131942 | 6/1986 |
| JP | 63-95564 | 4/1998 |

* cited by examiner

Standard Message Envelope (SME) Format.

|   |   |   |   |
|---|---|---|---|
| 1 | Header Sid | Header Layout Version | 1 |
| 2 | Source Node Sid | The message originating node system Id. | 6 |
| 3 | Message Receive System Time | The System time in YYYYMMDDHHMISSmmm format. | 17 |
| 4 | Internal Message Sid | Unique system Id of the received message. | 4 |
| 5 | Service Sid | The Message Processing Program (MPP) service system Id, which can process received message. | 4 |
| 6 | Target Node Sid | The message receiving node system Id | 6 |
| 7 | Data Format Indicator (Source) | Message data format type 0 - External Data Source 1 - Internal Data Source | 1 |
| 8 | Message Direction | The direction of message routing. | 1 |
| 9 | Processing Time | Elapsed message processing time in milliseconds. | 5 |
| 10 | Processing Node Sid | The last processing node system Id | 6 |
| 11 | Target Line Node Sid | Line driver node system id. Assigned when terminal is attached to line group. | 6 |
| 12 | Message Text | The Message text in ISO8583 format | Variable |

FIG. 3

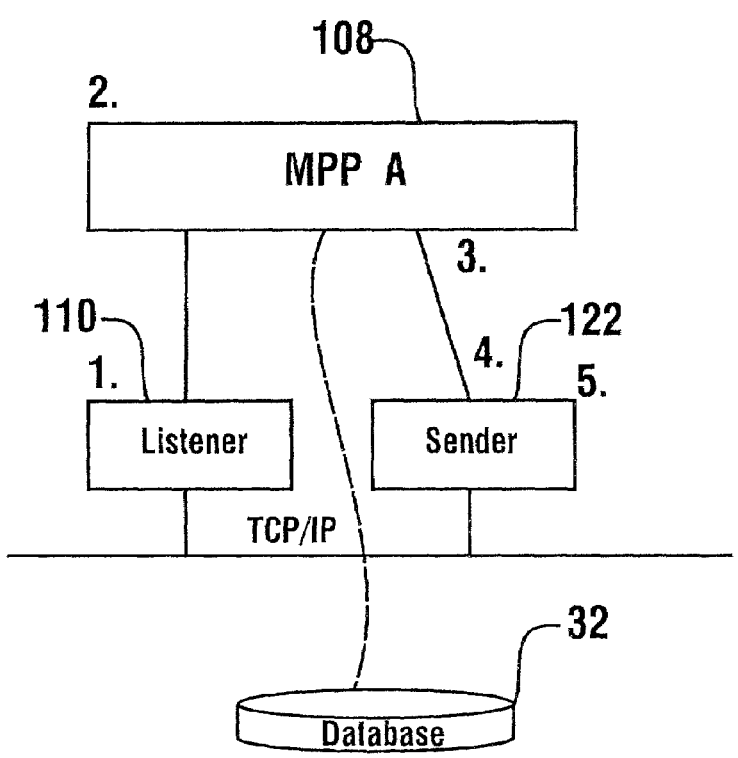

1. The Listener buffers the data, then places the data onto the input queue of the MPP.

2. The MPP performs various functions based upon the requirements of the message.
   - Builds an internal array.
   - Parses composite fields into subfields of the array.
   - May perform authorization.
   - Determines who to send the message to. May be an MPP or MGR
   - Builds a new message.

3. Sends a copy of the data to the database for archive.

4. Sends the message to the authorization host.

5. The Sender determines the IP address and sends the message.

FIG. 5

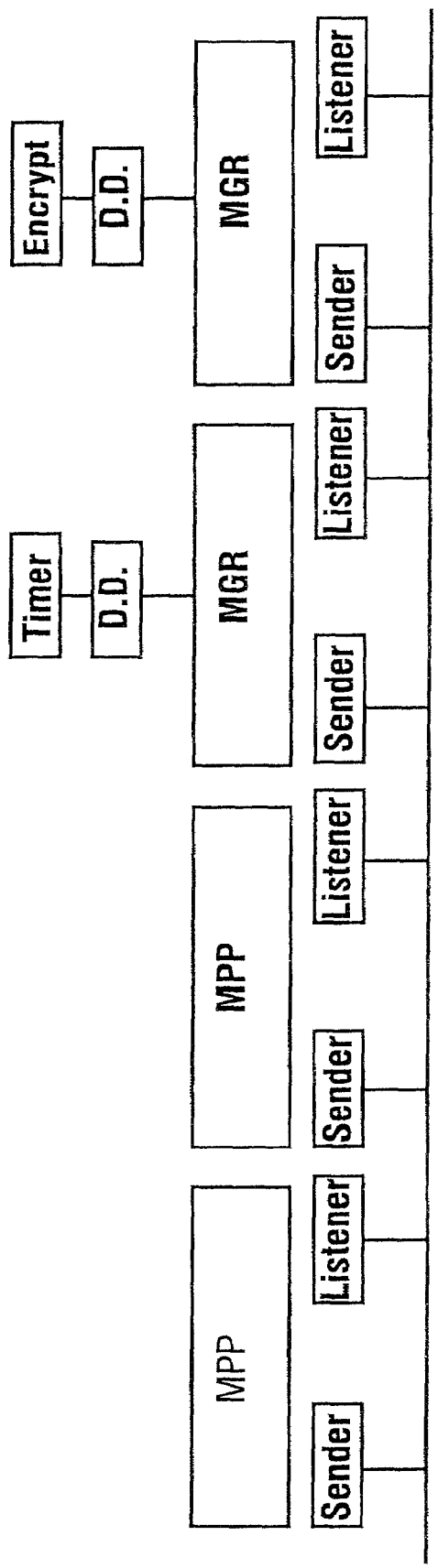

1. The Message is sent to the second MPP. It uses a echo-back field to determine the orgin of the message. The database contains the original message with a key. It may send the message to the first MPP by calling the Encryption Device for decryption of the PAN.

2. The message is received by the first MPP. It may need to build special fields, such as track II data. It will then send the message back to the original calling device by using the saved data in the database.

FIG. 9

1. The Listener buffers the information.

2. The MGR parses the ISO 8583 message into a message format that can be used by the device.

3. The Device driver sends the message to the device.

4. The POS terminal returns a message confirming the authorization message.

The message is then returned to the MPP in the same manner as before.

EXTERNAL_HOST

| | | |
|---|---|---|
| HOST_SID | <pk> NUMBER(6) | not null |
| HOST_NUM | VARCHAR2(15) | null |
| NAME | VARCHAR2(30) | null |
| ADDR | VARCHAR2(30) | null |
| CITY | VARCHAR2(20) | null |
| STATE | CHAR(2) | null |
| COUNTRY_CODE | CHAR(3) | null |
| ZIP_CODE | CHAR(9) | null |
| CONTACT_NAME | VARCHAR2(30) | null |
| TELEPHONE | VARCHAR2(16) | null |
| NODE_SID | NUMBER(6) | null |
| COMMENTS | VARCHAR2(30) | null |
| STATUS | CHAR(3) | null |
| STATUS_DATE | DATE | null |

SERVER_HOST_LINK

| | | |
|---|---|---|
| SERVER_SID | <pk,fk> NUMBER(6) | not null |
| HOST-SID | <pk,fk> NUMBER(6) | not null |
| PRIORITY | NUMBER(2) | null |

SERVER_SID = SERVER_SID

SERVER

| | | |
|---|---|---|
| SERVER_SID | <pk> NUMBER(6) | not null |
| NAME | VARCHAR2(20) | not null |
| IP_ADDR | VARCHAR2(20) | not null |

COL_VALUE

| | | |
|---|---|---|
| TABLE_NAME | <pk> VARCHAR2(20) | not null |
| COLUMN_NAME | <pk> VARCHAR2(20) | not null |
| ITEM_OFFSET | <pk> NUMBER(2) | not null |
| COLUMN_VALUE | <pk> VARCHAR2(3) | not null |
| DESCRIPTION | VARCHAR2(30) | not null |

STATUS_REASON

| | | |
|---|---|---|
| TABLE_NAME | <pk> VARCHAR2(20) | not null |
| STATUS_VALUE | <pk> CHAR(3) | not null |
| REASON_NUM | <pk> NUMBER(2) | not null |

SYSTEM_PARM

| | | |
|---|---|---|
| SYSTEM_PARM_SID | <pk> NUMBER(4) | not null |
| PARAMETER | <pk> VARCHAR2(10) | not null |
| VALUE | VARCHAR2(20) | not null |
| FMT | VARCHAR2(10) | not null |
| STATUS | CHAR(3) | not null |
| STATUS_DATE | DATE | not null |
| DESCRIPTION | VARCHAR2(30) | not null |

FIG. 24

FINANCIAL TRANSACTION PROCESSING SYSTEM AND METHOD

This application is a divisional of co-pending application Ser. No. 09/483,104 filed Jan. 14, 2000 which is a divisional of Ser. No. 08/813,510 filed Mar. 7, 1997, now U.S. Pat. No. 6,039,245, which claims the benefit of U.S. Provisional Application No. 60/019,544 filed Jun. 10, 1996, U.S. Provisional Application No. 60/021,871 filed Jul. 17, 1996, and U.S. Provisional Application No. 60/025,266 filed Sep. 17, 1996.

TECHNICAL FIELD

This invention relates to financial transaction processing systems. Specifically, this invention relates to a system and method for processing financial transactions that originate at credit, debit or stored value card activated terminals such as automated teller machines and point of sale terminals.

BACKGROUND ART

Systems and methods for processing financial transactions are known in the prior art. Such systems include those used to process credit card transactions and debit card transactions. In systems of this type, transaction messages are transmitted between card activated terminal devices and remote computer systems which authorize the transactions. Such systems also keep an accounting of the amounts to be charged to a customer's account and credited to the account of a merchant or bank. Such card activated terminal devices include automated teller machines ("ATMs"), point of sale ("POS") terminals and other financial transaction terminal devices. Terminal devices of these types can also be activated using stored value cards, which are sometimes referred to as "cash cards" or "smart cards".

In transaction processing systems, transaction messages often must be passed between and processed in several different computer systems. Messages pass from the terminal devices to the remote systems that can authorize and track the transactions. Return messages pass from the remote systems back to the terminal devices.

The development of transaction processing systems has been complicated by the fact that different card activated terminal devices communicate using different messages and different message formats. Further complicating the development of such systems is that transaction messages must be passed and tracked through systems which have different types of hardware and software. This has necessarily limited the capabilities of transaction processing systems.

In recent years an effort has been made to develop standardized formats for financial transaction messages. For example, the International Organization for Standards has developed International Standard ISO 8583 entitled Financial Transaction Card Originated Messages—Interchange Message Specifications, 2nd Edition, 1993. This publication which is ISO Reference No. ISO 8583, 1993(E) is incorporated herein by reference. This ISO Standard provides a somewhat standardized typography for certain types of electronic financial transaction messages. However, while the Standard provides guidelines for the content of messages, it does not provide standardization for methods to be used in routing of such messages. As a result, the methodology for routing messages remains to be dealt with within the programming constraints of the particular type of hardware and software associated with a particular system.

A further complication with respect to the ISO 8583 Standard is that it does not specify a single message format. Rather, the Standard is flexible in that certain data fields which may be a part of a message, are not required to be present in all messages of the same type. Thus, some messages complying with the Standard may contain data that other messages of the same type also fully complying with the Standard, do not. The ISO Standard messages may also have so-called "private fields" in which those using the Standard may include data of their choosing.

The fields which make up the parts of a Standard compliant message may also have various lengths. Operators of systems and vendors of terminal devices each have implemented the ISO Standard for their systems or devices somewhat differently. As a result, while certain aspects of the messages may be the same, they are often substantially different. This poses challenges for system operators in processing transaction messages which comply with the ISO Standard.

A further complication in the processing of financial transaction messages is that there is a large installed base of terminal devices which do not comply with the ISO Standard. Such devices use their own unique message formats. As a result, it is necessary to translate messages from these devices into different formats for subsystems that use and ISO Standard format. Of course, these subsystems must include hardware and software for translating their messages into the message format of the particular terminal device when transaction messages pass from the subsystem to the device.

The need for financial transaction processing systems to translate messages from one format to another adds complexity and cost to such systems. A further drawback is that efforts to expand such systems so that they can communicate with additional types of terminal devices and other systems, require the development of software that can process and generate the various types of messages that are encountered. This usually results in a patchwork systems architecture which takes considerable time to develop and which cannot be readily expanded. All of these drawbacks add cost and complexity to financial transaction processing systems.

Thus, there exists a need for a financial transaction processing system and method that is more readily adaptable to communicating with a variety of other types of external systems and terminal devices, which can be more readily modified and upgraded to communicate with different types of external systems and terminal devices, and which can be more readily expanded to add new features and functions.

DISCLOSURE OF INVENTION

It is an object of the present invention to provide a transaction processing system which can communicate with a plurality of other types of transaction processing systems.

It is a further object of the present invention to provide a financial transaction processing system that can communicate with different types of terminal devices that communicate in varied message formats.

It is a further object of the present invention to provide a financial transaction processing system that can be more readily adapted to communicate with other types of systems and devices.

It is a further object of the present invention to provide a financial transaction processing system that is more reliable by providing distributed and redundant processing capabilities.

It is a further object of the present invention to provide a financial transaction processing system that will operate on a variety of computer software and hardware platforms.

It is a further object of the present invention to provide a method for processing transactions that enables translation of messages between varied message formats.

It is a further object of the present invention to provide a method for processing financial transactions that enables communication between authorization systems and terminal devices which use different message formats.

It is a further object of the present invention to provide a method for processing financial transactions that uses common method steps for converting transaction messages of various types into a common message format.

It is a further object of the present invention to provide a method for processing financial transactions that provides a common approach to building outgoing transaction messages that can be used with a variety of outgoing message formats.

It is a further object of the present invention to provide a method for processing financial transactions that is fast and reliable.

Further objects of the present invention will be made apparent in the following Best Modes for Carrying Out Invention and the appended claims.

The foregoing objects are accomplished in an embodiment of the present invention by a financial transaction processing system in which transaction messages are routed to and from card activated terminal devices. The card activated devices are commonly point of sale terminals and automated teller machines. Transaction messages are transmitted from the terminal devices to an authorization subsystem or network. Exemplary embodiments of the present invention may have one or more of the following objects of the invention. The authorization subsystem may be integral with the financial transaction processing system of the present invention or may be a separate and distinct external system or network of systems. Transaction messages from the authorization subsystem are routed through the system of the present invention and back to the proper terminal device.

The preferred embodiment of the present invention includes a distributed processing system and preferably runs on several different computers. The computers are connected through interfaces and device drivers to external devices which include authorization systems or networks and terminal devices. The system software further includes a relational database which is programmed with database table records which includes data representative of the message formats used by each type of terminal device and external authorization system to which the system is connected.

The system software includes a message gateway router ("MGR") which operates to take each message that comes from a terminal device or external authorization system or network, and transform the message into a common internal message format based on the information in the database. This process for transforming external messages having different formats to a common uniformly defined format, is carried out through a systematic series of steps which are common to a wide variety of external messages which can be processed.

Once in the internal message format, the messages are routed and processed by one or more message processing programs ("MPPs"). MPPs process each message depending on its type and generate a resulting message. The resulting message is then routed to an appropriate address in the system. The system may include various types of application programs for authorizing transactions within the system and storing information in the database. Certain types of transaction messages may be processed in the system of the invention and the resulting message converted to a different format which is used by an external authorization system or network. The format of the message transmitted to the external authorization system may be a totally different message format from both the message format used internally by the transaction processing system of the invention as well as the message format used by the terminal device which originated the message to the system.

The present invention is structured to provide distributed processing by networking the software components across various items of computer hardware. In addition, the preferred form of the present invention processes financial transaction messages based on database structures which may be readily developed and modified through a graphical user interface ("GUI"). This enables the system configuration to be readily changed and facilitates modification of the system to process transaction messages between additional types of external authorization systems and terminal devices which use different message formats.

BRIEF DESCRIPTION OF DRAWINGS

FIG. 3 is a schematic view of a standard message envelope representing the data included in internal messages transmitted within the financial transaction processing system of the present invention.

FIG. 5 is a schematic view of how a transaction message is further processed through a portion of the financial transaction processing system of the present invention beyond the processing steps shown in FIG. 4.

FIG. 9 is a schematic view showing further processing of a message within the financial transaction processing system of the present invention beyond the processing steps shown in FIG. 8 when encryption or decryption of the message is required.

FIG. 24 is a partial database schema including portions of a database schema used for determining the system address for a message processing program.

FIG. 28 is a schematic view of a timer used within the system of the invention to verify that outgoing or incoming messages are properly responded to.

BEST MODES FOR CARRYING OUT INVENTION

Figure 1:
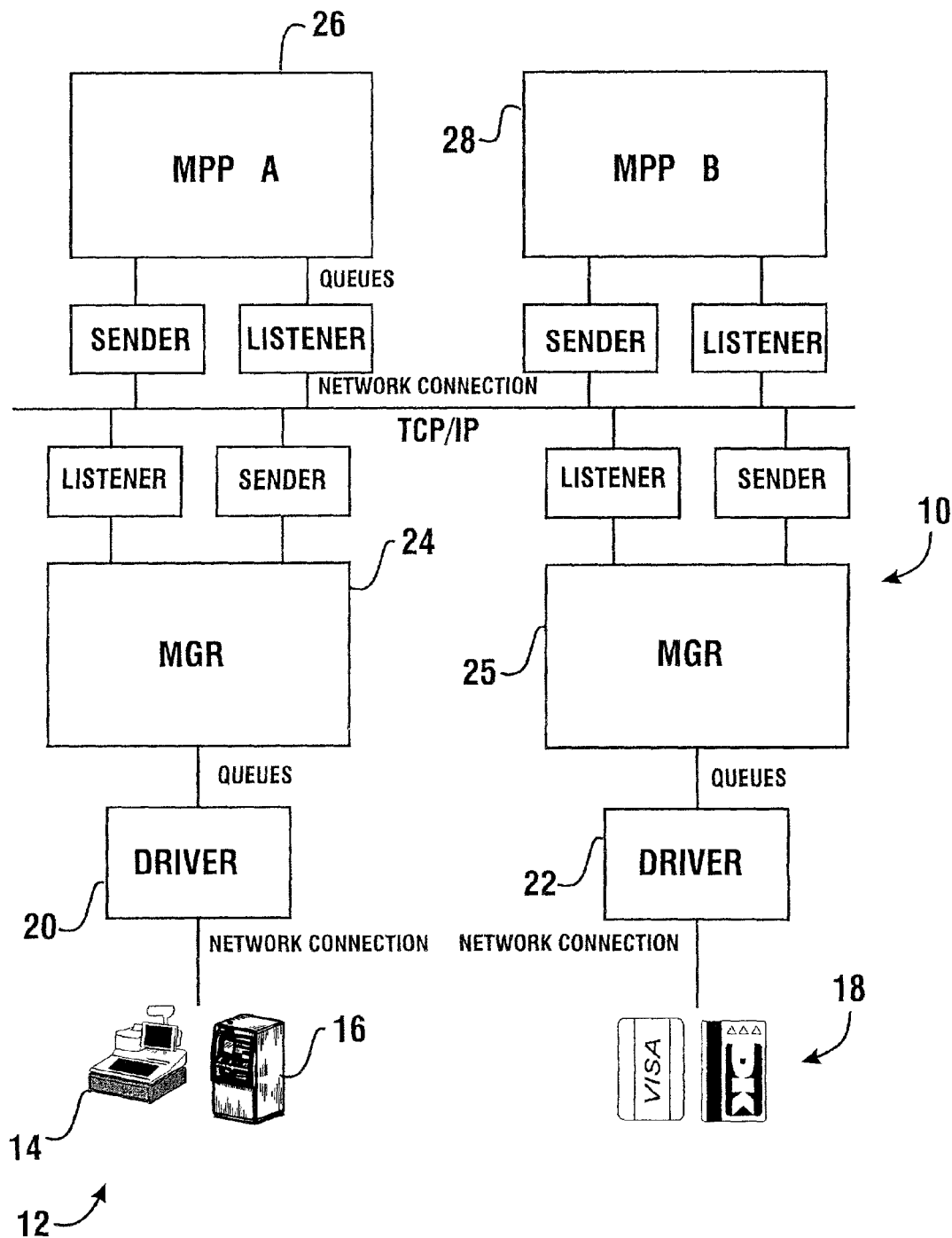
FIG. 1 is a schematic view of the network topography of a financial transaction processing system of an embodiment of the present invention.

Referring now to the drawings and particularly to FIG. 1, there is shown schematically therein the topography of an embodiment of the financial transaction processing system of the present invention generally indicated 10. The system communicates with terminal devices 12 which are represented by point of sale terminal 14 and an automated teller machine ("ATM") 16. It should be understood that the present invention is intended to be used to communicate with a wide variety of terminal devices which may be connected to the system either individually or as part of a group of devices networked together.

The system 10 further communicates with external authorization systems generally indicated 18. These external authorization systems may include credit card processing networks such as VISA® or MasterCard®. In addition, these external authorization systems may include debit card processing systems such as the Cirrus® or Plus® networks. Alternatively, the external authorization systems may include systems operated by individual financial institutions or proprietary networks which authorize and track transactions. Both terminal devices and external systems are considered as external devices for purposes of processing transactions in the system of the present invention.

Terminal devices communicate through electronic messages. Electronic messages from the terminal devices are communicated through a driver generally indicated 20. The driver is a device which can send and receive messages from the terminal device to which it is connected. Likewise, the external authorization systems 18 send and receive messages to and from the remainder of the system through a driver 22.

As shown in FIG. 1, the drivers 20, 22 are in operative connection with one or more computers and each pass messages to and from a software component within the system called a message gateway router or "MGR" 24, 25. As later explained, the MGR operates to take incoming messages and to convert them into a common internal message format used within the financial transaction processing system of the invention. Similarly, the MGRs 24, 25 also convert internal messages within the system to the external message formats needed to communicate with the various external authorization systems 18 and terminal devices 12. Although multiple MGRs may be shown in the drawings it should be understood that all MGRs are identical.

The financial transaction processing system of the invention also includes software components called message processing programs or "MPPs". The exemplary system shown schematically in FIG. 1 includes an MPP 26 and an MPP 28. These MPPs are intended to represent processes performed by the system using messages of a particular type. It should be understood that the system may execute a large number of processes and that there may be a large number of MPPs. Because each MPP is made to process a particular type of message, each MPP is generally different from other MPPs.

As shown in FIG. 1, the financial transaction processing system of the present invention uses distributed processing in which the MGR and MPP components communicate through an internal network. The network uses the TCP/IP network communication protocol which is known to those skilled in the art. TCP/IP enables messages to be moving between a plurality of different components within the system simultaneously and further enables messages to be transmitted and received between system components which may be operating on computers running at different speeds and in geographically distant locations. The preferred embodiment of the invention enables the asynchronous processing of transactions in a manner later explained in detail.

Each of the logical software components of the system communicates through the TCP/IP network through an associated listener and sender software as graphically represented in FIG. 1. Each listener serves to capture and assemble messages intended for its associated destination from the TCP/IP network within the system and to place the received messages in queue for delivery to the associated component. Similarly, each sender derives the address of the next component in the system that will process the message and dispenses the message into the network for delivery to the destination. Each listener in the system operates in an identical manner to all other listeners. Likewise, each sender works in a manner identical to all other senders. The manner in which TCP/IP networks operate for the dispatch and receipt of messages is known to those skilled in the art.

Figure 2:
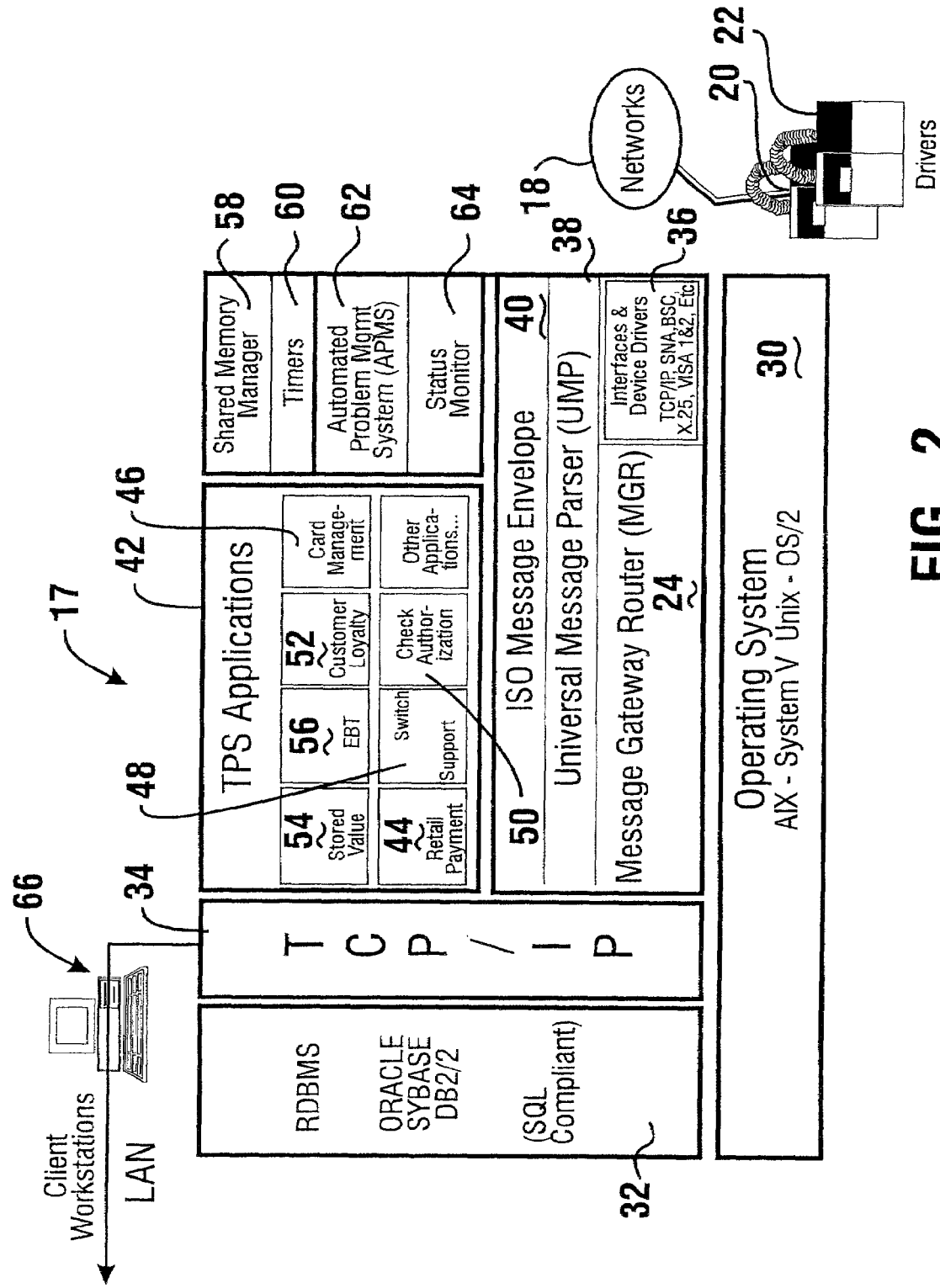
FIG. 2 is a schematic representation of the software components which comprise an embodiment of the software of the financial transaction processing system of the present invention.

A graphical representation of the logical levels of software components of the financial transaction processing system of the present invention is shown in FIG. 2. The software components of the system operate in one or more computers. The software which operates in a computer schematically indicated 17, includes an operating system component schematically indicated 30. The operating system operates on compatible computer hardware and may be one of several commercially available systems such as OS/2 or AIX from International Business Machines, Windows NT from Microsoft Corporation or UNIX from Novelle, Inc. It should be understood that the software of the present invention is intended to run on different types of hardware platforms which may be running different operating systems within a distributed processing system connected through the internal TCP/IP network.

The software architecture of the preferred embodiment of the present invention further includes a relational database schematically indicated 32. The relational database is preferably one that employs structured query language ("SQL") compliant commands. Such databases-include commercially available products such as Oracle from Oracle Corporation, Sybase from Sybase, Inc. or DB2 from International Business Machines. Of course other embodiments may employ other types of databases and/or other approaches to storing and recovering data. The database is alternatively referred to herein as a memory or data store.

As previously discussed, the system preferably includes a networking software component schematically indicated 34. This enables the software components of the internal network of the system to communicate in a local area network ("LAN") or a wide area network ("WAN") configuration. The preferred form of the invention employs TCP/IP communication, but in other embodiments other networking approaches may be used.

The software further includes device drivers schematically indicated 36. Each software driver is set up to communicate specifically with the terminal or network drivers 20 or 22 which communicate with particular devices, terminals or networks which are connected to the drivers through data lines.

Drivers are also included which communicate with external authorization systems and networks 18. Device drivers may be included which communicate directly with a particular transaction processing terminal. Such communication may be through lease line or modem type communications. As later explained, in the preferred form of the present invention the characteristics of messages associated with a particular external message destination such as a line or terminal, are defined and stored in the database 32. These defined characteristics enable the deciphering or constructing of messages that pass to and from the connected external devices which include authorization systems, networks and terminals.

The software components of the system further include the message gateway router ("MGR") previously mentioned. The system may run several MGRs, but each is identical. The MGR includes functional subcomponents which include a universal message parser ("UMP") 38. As later discussed, the MGR using the universal message parser serves to interpret incoming messages and transform them to a common internal message format for routing and processing within the system.

The MGRs further place incoming messages in a standard message envelope ("SME") designated 40. The SME is the internal message format used within the system of the invention. The SME includes a data portion of the message in an ISO message format, as well as a header which includes routing information used to route messages between the components of the system. MGRs also operates to convert outgoing messages from the internal SME message format to external formats.

The software architecture also includes application programs generally indicated 42. The application programs include instructions for carrying out various types of transaction processing within the system. As graphically shown in FIG. 2, some representative types of applications include a retail payment application 44. This software application may be used for example by a retail chain store which issues its own store credit card to customers. When a retail payment application is included as part of the system, information concerning customers and their associated cards and amounts would be maintained within the database 32. The operator of the retail payment system could then keep track of the customers using its store credit card and bill the customers for the value of items purchased on credit using their cards at the stores of the retailer/system operator.

The system operator can keep track of the cards that were issued, including the identities of the customers who have them, their associated credit limits and other information, using a card management software application, schematically indicated 46. The card management application 46 works in conjunction with information in the database to control the production and issuance of new cards, to invalidate lost or stolen cards or to render temporarily unusable cards that are over a user's credit limit.

Of course, in most financial transaction systems it is necessary to accept cards other than those which may have been issued by a particular retailer. Such cards commonly include MasterCard®, VISA®, American Express®, Diner's Club®, Discover® and other credit or debit cards. As a result, it is often necessary to have software applications which will route these transactions from the system to the proper external authorization network and back again. Such programs are schematically represented by the switch support application 48.

The financial transaction processing system of the present invention may also include other software applications.

These may include check authorization, schematically indicated 50. Such an application may determine whether a particular customer who wishes to cash a check should be allowed to make a payment in that manner. Such applications may involve checking data within the database 32 to determine if the customer meets certain criteria and/or making inquiries to authorization networks 18 or to particular financial institutions.

Another exemplary application within the software is an application which tracks customer loyalty which is generally indicated 52. Such an application is used to determine how frequently a particular customer purchases from a particular establishment using a debit or credit card. Similarly, a software application may be used to determine what products or brands of merchandise a particular customer purchases and how frequently such purchases are made. Within the system provisions are made for recording and tracking this information within database 32, or within other databases which may be connected to the system through the internal network or external networks.

The software architecture of the invention as indicated in FIG. 2 may include applications which process transactions from stored value cards or so-called "smart cards." Such software is graphically designated 54 as a stored value application. This application contains the instructions necessary to process the various transaction schemes associated with stored value cards, as well as the information necessary to communicate information concerning the use of stored value cards to and from various external networks and devices. Typically stored value cards work in connection with or as an adjunct to a credit or debit card. This enables a single smart card to operate as a credit card or debit card, as well as a cash substitute. The stored value application 54 may also operate to add value to a stored value card either on a credit or debit basis through internal processing and/or by communication with external authorization systems or networks.

A further application shown in the software architecture is an electronic benefits transfer ("EBT") application. The EBT application schematically designated 56 may be used for processing card based transactions associated with public benefits. For example, it is becoming increasingly common for public benefits recipients to receive their benefits electronically so as to eliminate paper vouchers or food stamps. EBT application 56 enables transmission and processing of messages from various POS terminal devices and/or exchange of messages with the external networks and systems which are capable of processing, authorizing and recording electronic benefits transactions.

It should be understood that the system of the present invention may include only some of the software applications discussed herein, which are exemplary. Other applications which perform different functions may also be used.

The software architecture of the preferred embodiment of the present invention also includes a shared memory manager component ("SMM") 58. The SMM 58 enables the holding of data from the database for ready access in the shared memory of the computers of the system. The SMM has an associated routine which places into a block in RAM selected database information at system start up. Maintaining information in the SMM rather than making more frequent physical read requests to the database 32 makes the software of the present invention operate more rapidly.

A timer component 60 of the invention is used to keep track of messages that are sent by the system. This enables the asynchronous processing of messages. As later explained, if a message should become lost or if an error should prevent further processing of a message, the timer component returns the original message to the sending point. This enables the occurrence of such event to be detected.

The system further includes an automated problem management system application ("APMS") 62. The APMS software is used for tracking and recording problems that arise within the system. The APMS 62 is connected with a status monitor software component 64 which serves to track the operational status of various components in the system. As a result, the APMS can be used to identify areas within the distributed system which are down or which are experiencing delays. The APMS may also be structured to re-route transaction messages to other sites where the desired processing may be accomplished.

A further feature of the software of the present invention is graphical user interface software application generally indicated 66. The graphical user interface ("GUI") is associated with client workstations which are preferably computer stations which include displays and input devices. These stations enable the set up of system configuration data by manipulating the information held within the database. This is done in the preferred embodiment through the use of a GUI created using rapid development, object oriented software interface development tools for SQL compliant databases. A suitable tool for such use in such development is PowerBuilder® software from PowerSoft Corporation.

Using the GUI creation tools, high level graphic representations of system components including hardware and software are provided which may be manipulated by a systems operator. Such manipulation may include the ability to add or delete terminal and network connections to the system, to reconfigure the system to communicate with different terminals and networks, and to add, delete and modify the information to be used by the various application programs. The graphical user interface software component may also be used to select various types of terminal on-line connections which will then change message routing. The user is enabled to input the desired changes using input devices such as a keyboard or mouse and to observe the results of the changes on the display. The GUI enables the user to configure the system at a high level. The user's configuration changes the underlying database relationships so the system changes its operation to conform to the changes input through the graphical user interface.

The GUI also preferably enables the client workstations to be used to easily set up data in the database, as well as to track desired functions and information. Such macro instruction capabilities provided through the GUI enable the rapid development and configuration of database information tailored to the particular type and operation of the system involved.

The software of the preferred embodiment of the present invention is delivered into the computers of the system from computer readable media which includes the instructions which are operative to cause the computer to carry out the steps later described. The computer media may include any media from which the software may be read including for example one or more tapes, diskettes or a hard disk drive. The software may be installed by placing the media in the computer or by loading the software from media residing in another computer through an electronic "download".

It will be appreciated by those skilled in the art that the system of the present invention provides a generally uniform approach to processing a widely disparate group of incoming card based transaction messages which involve different message formats and message types which places such messages in a uniform internal format. By processing these disparate messages in a consistent and systematic way the system is enabled to receive and process these messages and to produce messages which may be further processed within the system and/or communicated to external authorization systems or networks in the external formats recognized by such systems and networks.

Transaction Processing Example

To more fully explain the operation of the financial transaction processing system of the present invention, an example of how a transaction is processed through the system is hereinafter described. It should be understood that this is an example of a particular type of financial transaction and that other embodiments of the invention may use somewhat different process steps and parameters.

Figure 4:
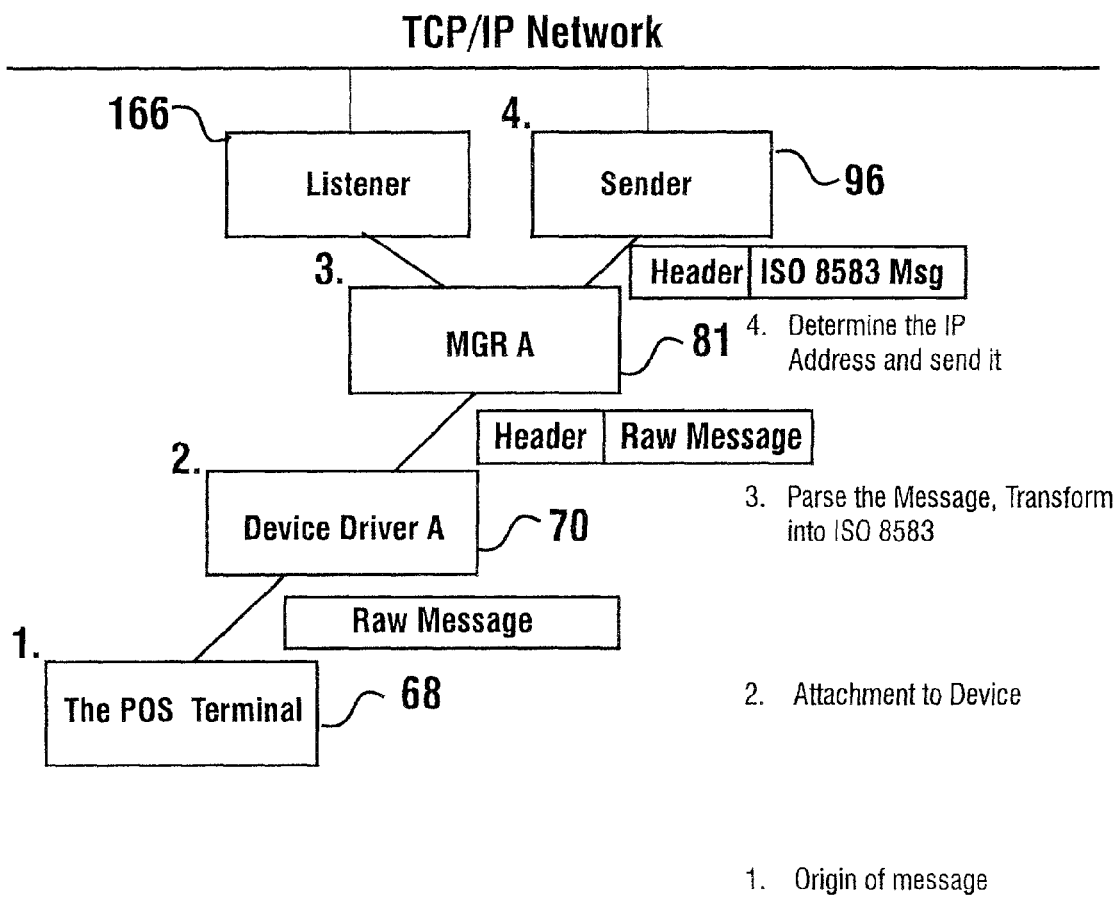
FIG. 4 is a graphical representation of a transaction message passing through a first portion of the financial transaction processing system of the present invention.

Referring to FIG. 4, in this example a message originates from a terminal device which in FIG. 4 is a POS terminal 68. POS terminal 68 of necessity is capable of generating as well as receiving many messages, all of which in this example have the same message layout or format. These messages may or may not be in some type of ISO 8583 message format. Typically however, to be used as a transaction terminal, the messages transmitted and received from POS terminal 68 must include certain information. For example, card based transaction messages usually include customer identifying information such as a customer's account number.

POS terminal 68 must also be capable of sending information which identifies where it is located, and the entity such as a retail establishment in which it is operating. This enables the entity that is providing merchandise, services, credit or cash to the customer to be properly credited with the amount charged to the customer (less transaction fees). Likewise, messages going to and from the POS terminal must be capable of representing amounts associated with the various transactions. Other transaction messages reflect situations where the customer's card is invalid or where the transaction is denied for various reasons. POS terminals or other card activated terminal devices often must send and receive information necessary for verification of personal identification numbers ("PINS") which verify that the proper customer is using the card.

Other messages transmitted to or from POS terminal 68 may include messages associated with encrypting or decrypting data. These may include keys which enable the scrambling or unscrambling of transaction messages to prevent fraud or improper use of transaction processing systems.

Other transaction messages may include repeat messages in the event that a first message is lost. Other data generated by the terminal 68 may reflect the particular items purchased or services rendered as part of the transaction. Various goods purchased may be tracked as part of the transaction. This is facilitated through linking the POS terminal to an electronic cash register which is connected to a database containing inventory information. Other transaction messages from a POS terminal may include batch transmission of a log of daily transactions conducted at the terminal.

While a large number of transaction message types have been identified in the ISO 8583 Standard, it will be apparent to those skilled in the art that an even greater variety of transaction message types may be transmitted by or received from terminal devices of various types.

Device Driver

Figure 11:
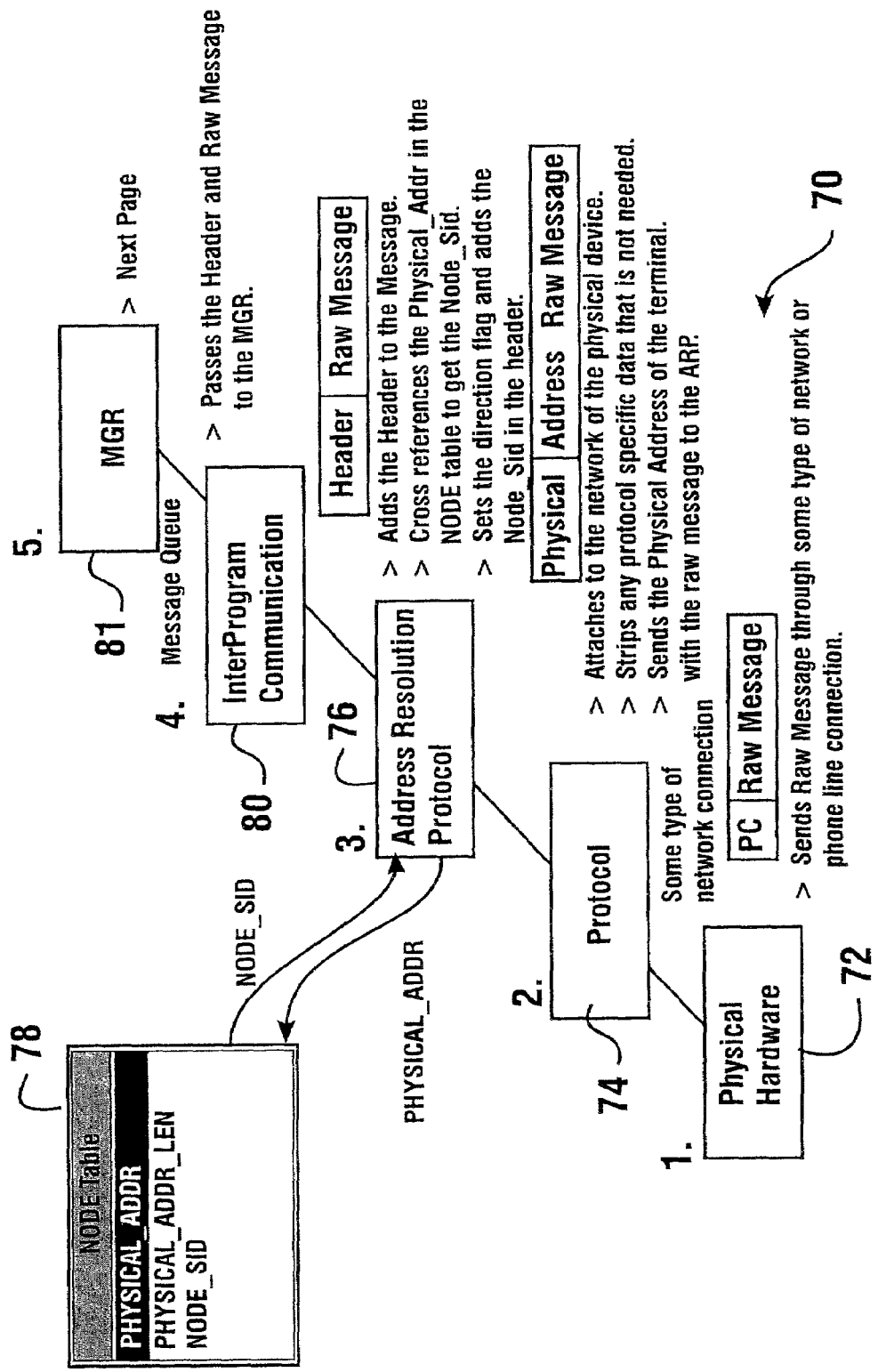
FIG. 11 is a schematic representation of a message being processed from a terminal device through a line driver and into a message gateway router of the financial transaction processing system of the invention.

As shown in FIG. 4, POS terminal 68 communicates messages to and from a device driver indicated 70. The functions performed by the device driver are schematically shown in FIG. 11. The terminal 68 is connected to physical hardware generally indicated 72. This physical hardware is a type of network data line or phone line connection which enables the electronic messages to enter and exit the device driver portion of the software. This physical hardware receives and transmits the raw messages which come from and go to the terminal in the format used by the terminal.

A protocol portion of the software in the device driver is schematically indicated 74. Protocol portion 74 is connected to and controls the physical hardware 72 in accordance with its application programming interface ("API"). The protocol portion 74 of the device driver 70 operates on an incoming message to strip any protocol dependent parts of the raw message. This is done based on the protocol definition which is programmed in the device driver component. The protocol portion 74 also operates to provide a data item representative of the identity or physical address of the particular terminal from which the message is coming.

The protocol portion of the software sends the raw message and the physical address information to the address resolution protocol portion ("ARP") 76 of the device driver. The ARP 76 performs several functions. First, it adds a system header to the text of the raw message. This system header is initially a series of blanks or zeros. It is constructed to eventually have data in the 12 message fields of the standard message envelope ("SME") shown in FIG. 3. The header that is added by ARP 76 is sized to accommodate data fields 1 through 11. The raw message from terminal 68 minus protocol dependent portions is in message field 12 at this point.

The ARP 76 of the driver 70 also operates to insert header layout version data in field 1 of the header. This data as shown in FIG. 3 is representative of a header layout version. Generally a financial transaction processing system will only have one header layout version. However, if it is desired to accommodate several different header layouts, perhaps so the system may process both financial messages and other types of messages, this may be facilitated by having various line drivers apply different headers depending on the type of messages defined as coming into the system through the particular driver.

The ARP 76 also operates to insert data in field 8 of the header to indicate that the message being handled is an incoming message. It also inserts data in field 7 to indicate the message is coming from an external source. This indicates that the message needs to be processed from the raw external message format to the standardized internal message format.

As shown in FIG. 11, the ARP 76 operates to access data which is stored in the database, but which is preferably available in block memory in RAM when the system is running because of the shared memory feature of the system. The database includes data representative of system "nodes", each node corresponding to a component of the system. One data block includes node table records associated with the particular line and/or terminals attached to the line which is sending the message to the system. This data is laid out in a node table record 78 which is partially shown schematically in FIG. 11. The node table record 78 contains considerable information associated with the line and/or terminal from which the message is coming. By matching the node table record containing the physical address data which has been delivered to ARP 76, with the node table records in memory, the system can find a node ID which is called a NODE_SID in table record 78. The NODE_SID is determined by matching the node table record which has the corresponding physical address data therein. The ARP 76 then operates to obtain the NODE_SID value from the node table record 78. The ARP 76 then places the NODE_SID value in field 2 of the header. The NODE_SID is the system identifier used in the system to identify the particular component in the system which sends or receives a message.

The ARP 76 then passes the raw message with the header portions filled in so far to the interprogram communication ("IPC") 80 portion of the device driver. The IPC functions in connection with the operating system software operating in the computer to send the message and header to a queue associated with a message gateway router, MGR 81 software component. The IPC also inserts the NODE_SID for the node table record for the line driver in field 10 of the header which is the current "processing node". The IPC also inputs the time it received the message in field 3 of the header. As no time has yet been spent processing the message, field 9 remains at zero.

Figure 21:
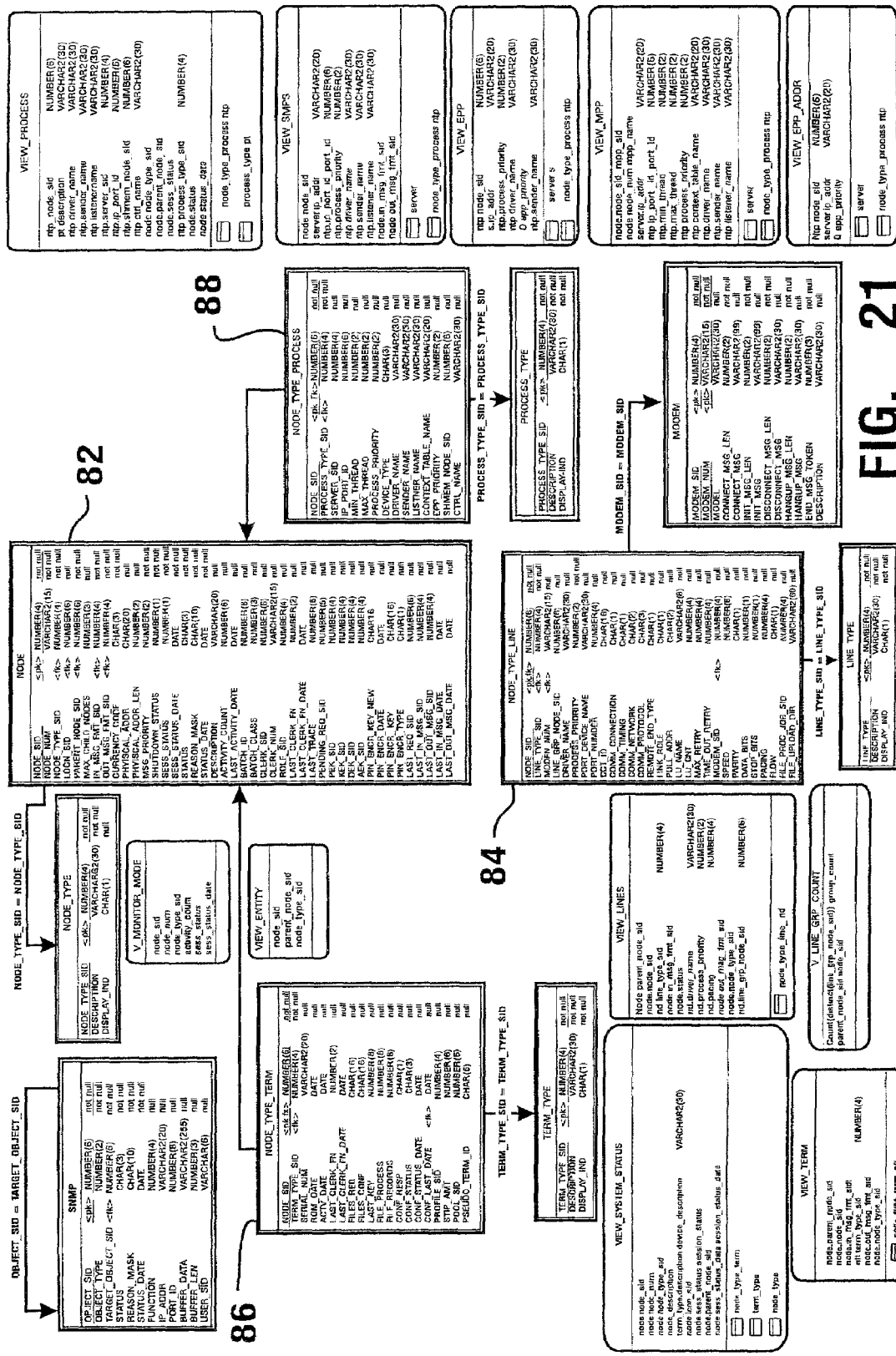
FIG. 21 is a partial database schema for system nodes showing the layout of data records associated with node type terminal, node type line and node type process nodes of the financial transaction processing system of the present invention.

While the example of node table record 78 shown in FIG. 11 is a partial schematic only, an example of the kinds of data found in node table records is shown in FIG. 21. FIG. 21 schematically shows three types of node tables. An upper portion 82 of the node table as shown is data that is typically stored for all types of nodes. Three types of nodes are typically encountered in the system of the invention each of which correspond to a type of system component. These are a node type terminal, a node type line and a node type process. If the particular-node is for a node type line, the data in the node table would include the data represented by the lower middle table portion 84 as shown in FIG. 21.

Similarly, if the node table is associated with a specific terminal, for example an automated teller machine, the node table would include the data in the upper portion 82 as well as the data as shown in the lower left table portion 86 in FIG. 21. External authorization systems are like terminals in that they are an external component or device which sends and receives messages. Likewise, timers 60, APMS 62 and encryption devices preferably have similar capabilities. As a result all these components have a similar node table layout which is designated as a node type terminal.

If a node is associated with a process such as a message processing program ("MPP"), a message gateway router ("MGR") or shared memory manager ("SMM"), the node type process table record has an upper node table portion 82. The table record also has a node type process portion associated with it similar to table portion 88 shown in the lower right in FIG. 21.

It will be understood that each node type has an associated node type table and that there are three distinct node type tables for lines, terminals and processes. FIG. 21 is structured as shown because each of these node type tables contains some of the same types of data and it is easier to show this common data through a single table portion 82 rather than in triplicate. It should be further understood that each node which corresponds to a component within the system, will have an associated node table record which defines the characteristics of the component represented by the particular node.

It should be noted for purposes of illustration that the tenth entry down in upper portion 82 of the node table shown in FIG. 21 is the PHYSICAL_ADDR value which is representative of a physical address. This is the physical address value that is matched by ARP 76 of driver 70 to find the corresponding NODE_SID which identifies the node table record for a particular terminal device. It should also be noted that node tables associated with node type processes do not include a physical address. This is because such nodes are within the internal system network and messages thereto are addressed through the TCP/IP network protocol as later discussed.

The message is now ready to be sent to the message gateway router 24. In this example only fields 1, 2, 3, 7, 8, 10 and 12 in the SME are filled in with data by the line driver. In other examples where the terminal which originated the message is part of a line group the ARP 76 also inserts the NODE_SID of the node type line table record associated with the line driver which receives the message, in field 11 of the SME. This is necessary to make sure that a message that is responsive to the original message can find its way back to the line that the original message came in on. This is important for handling dial up devices which may have messages come in on any of several phone lines. The data in field 11 enables a responsive message to be routed back to the device on the line which remains open during processing of the transaction. If the component sending the message always uses a designated line for communication with the system, field 11 of the SME is not used.

The Message Gateway Router

As shown in FIGS. 4 and 11, the message gateway router MGR 81 takes the message from the IPC 80 out of the input queue of that MGR. At this point the message structure includes the raw message that was sent by the terminal 68 in field 12 of the SME without the protocol portions of the original message.

Figure 12:
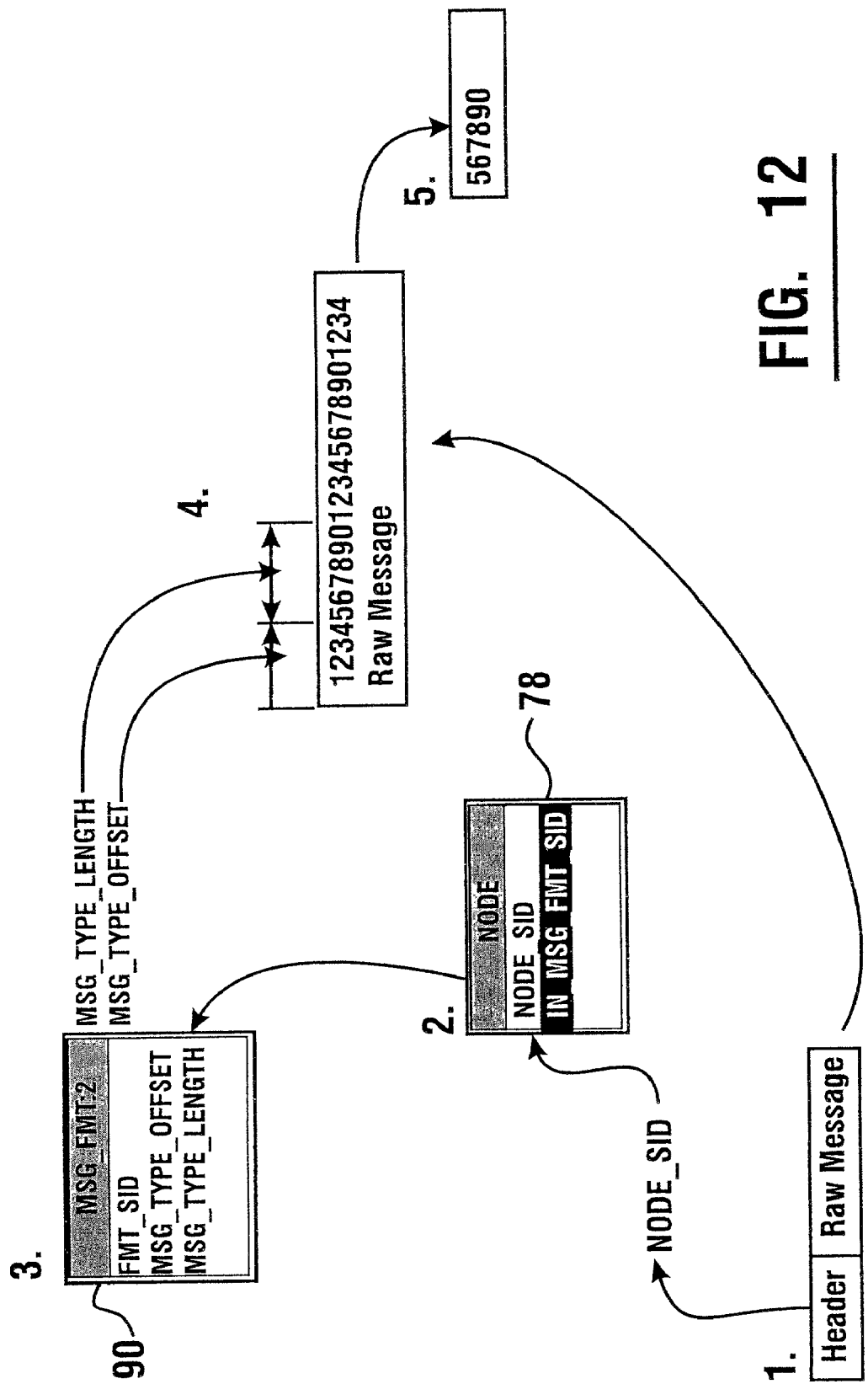
FIG. 12 is a schematic view of a financial transaction message being processed to identify it as a particular type of message within the message gateway router of the financial transaction processing system.

As schematically shown in FIG. 12, the MGR first operates to look at the message direction indicated in field 8 and the data source in field 7 of the header. If the message direction represents "in" the MGR puts the message in its buffer. The MGR then takes the NODE_SID value which is in field 2 of the header and looks up the corresponding node table record in shared memory. As the data source in field 7 indicates "external" the MGR is operative to transform the raw message to the internal format.

As shown in FIG. 12, the node table record 78 for the node associated with the terminal includes an entry which points to the format of incoming messages at that particular node. This entry is the IN_MSG_FMT_SID. It should be noted that in the layout of the actual node table 82 shown in FIG. 21 the IN_MSG_FMT_SID is the seventh entry down on the table. It is also indicated to be a "foreign key". The MGR is operative in this situation to read the IN_MSG_FMT_SID value in the node table record for the terminal 68 included in field 2 of the header.

It should be noted in FIG. 21 that the node table records contain data on both the format of messages coming in and out of a system node. Most devices and systems use the same message format for both incoming and outgoing messages so both table record entries are generally the same. However, it is possible to configure the system to send outgoing messages to an external device in a different message format than that used for incoming messages from the device if appropriate.

Figure 22:
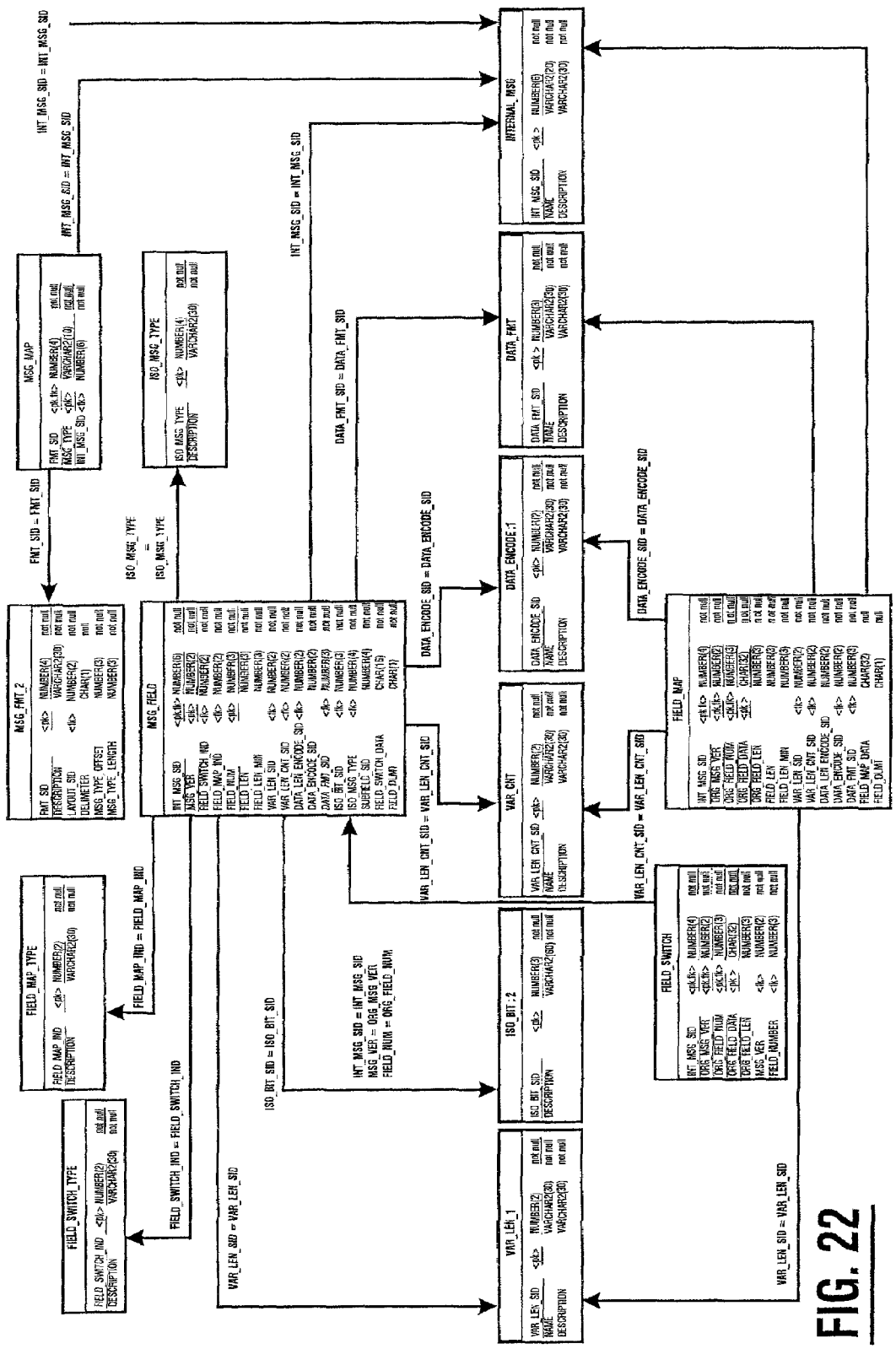
FIG. 22 is a partial database schema used for parsing and constructing messages having a non-ISO format in the message gateway router of the transaction processing system.

The MGR operates responsive to the information in fields 7 and 8 of the header to execute steps to transform the message text in field 12 of the SME. The MGR 81 holds the message from the line driver in a buffer and takes the IN_MSG_FMT_SID value to the data in shared memory and looks for a match in a "message format" table record that includes this entry. This is represented by message format table 90 in FIG. 12. Message format table 90 is designated MSG_FMT because as explained later, this corresponds to an actual table name for records in the database as shown in FIG. 22.

From corresponding message format table record 90, the MGR finds the message type offset and the message type length for the particular incoming message format. This is represented by the columns in the table MSG_TYPE_OFFSET and MSG_TYPE_LENGTH. The offset and the length are indicators of where to find data in the raw message that tells what type of transaction message the raw message is.

As graphically demonstrated in FIG. 12, the MGR proceeds to use the message offset to go into the message text in field 12, a distance equal to the offset number of bytes. In FIG. 12, an example is shown where the offset is four bytes, each byte being representative of a digit.

After going into field 12 of the message a distance equal to the offset, the MGR then reads the following number of bytes equal to the message type length. In the example shown in FIG. 12 the message type length is six digits. Again it should be remembered that the digits in the portion of the raw message determined by the message offset and message type length will be used to identify what type of raw message it is that is incoming from terminal 68.

The process executed by the MGR 81 to find offset and length values is also demonstrated with reference to the database schema shown in FIG. 22. The desired MSG_FMT:2 table record is found by searching for the IN_MSG_FMT_SID value shown as FMT_SID which is the "present key" to the table. The data corresponding to the message type offset and message type length are the fifth and sixth columns in the table, respectively.

Figure 13:
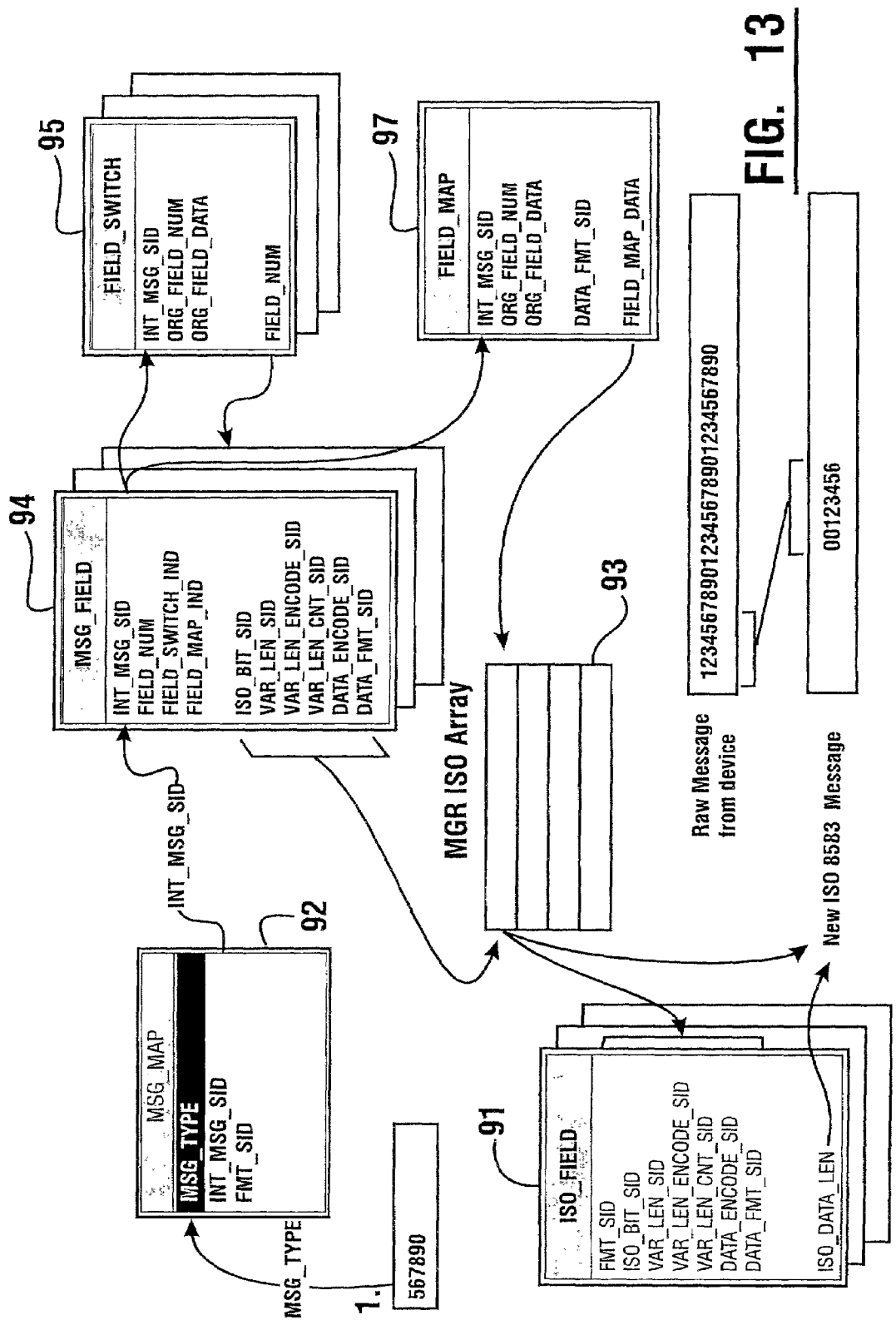
FIG. 13 is a schematic view of a message undergoing parsing and reconstruction into the system internal message format by the message gateway router portion of the financial transaction processing system.

Referring now to FIG. 13, the MGR 81 takes the bytes which represent the message type determined from the message offset and length, and goes to the database information in the shared memory. The MGR looks for a "message map" table record that includes both the message type value as determined from the offset and length information, and which also includes the IN_MSG_FMT_SID from the original node table record. By searching through message map table records a match is eventually found. As shown in FIG. 13, this data is found by the MGR in a particular message map table record 92.

From the message map table record 92 an internal message ID value is determined. This is represented INT_MSG_SID. This internal message format identifier is then placed in field 4 of the header shown in FIG. 3 by the MGR. It should be remembered that this INT_MSG_SID designator is representative of both the message format for incoming messages from terminal 68, as well as the particular type of message that has come from the terminal. This is useful because as later explained, this data can be used to determine how to parse the raw message data and place it into a standardized internal message format that is used within the system. This data is also used to determine the MPP where this message can be processed.

FIG. 22 shows a database schema which includes a message map table which is designated MSG_MAP. As shown, this table includes as "present keys" the IN_MSG_FMT_SID from the node table record which is indicated FMT_SID, and the message type designated MSG_TYPE. From these two data elements the INT_MSG_SID is determined which is the third column in the table.

The MGR next operates to set a counter, preferably to zero. This counter corresponds to a "field number". The parts of a financial transaction message in field 12 of the SME are called "fields". The indicia in each field represents particular information. In order to process transactions, the various message formats are defined as having a particular type of information in each field. Thus, in general it can be said that even though the values of information in a particular field may vary from message to message, the particular type of information represented by the values in that field for all such messages having the given format will be the same type.

The MGR operates using this principle when converting a message into the internal format to take each field in the raw incoming message and to copy that data into a new field in a new message. The field where the data is eventually positioned is determined by the ISO 8583 Standard in the preferred embodiment of the invention. As a result, a raw incoming message which may have a totally different format from an ISO message, is parsed, transformed and copied one field at a time to generate a new message which complies with the ISO 8583 Standard. Messages which partially comply with the Standard are likewise parsed, transformed and copied to create a new message that is consistent with the internal SME format to be used within the system of the invention.

Non-ISO incoming message formats which contain data which is not required to be in a particular field by the ISO Standard have such data placed in a private field in the ISO message by the MGR. The data is placed in the private field with a SUBFIELD_SID header. Each SUBFIELD_SID has its own parser database table records which define its fields. Likewise, incoming ISO compliant messages which contain private field data, will have that data maintained in a private field. However, as the MGR builds a standardized ISO message format for use within the system a corresponding SUBFIELD_SID header is placed with the data in a private field in a new message.

The process of parsing, transforming and reconstructing the raw message in field 12 of the SME into the internal ISO format is graphically demonstrated with regard to FIG. 13. The MGR takes the INT_MSG_SID value from the header and finds the message field table records including this value in shared memory. The MGR then takes the INT_MSG_SID and the FIELD_NUM value from the counter and finds a message field table record in shared memory which contains these two data elements. This is shown schematically by message field table record 94 in FIG. 13. The message field table record may contain a field switch indicator which points to field switch table records 95. The field switch table records contain information on conditional message field ordering. The message field table record also may include a field map indicator which points to field map table records 97. The field map table records contain information on how constant data values found in the original raw message are to be converted to other data values which are placed in the fields of the new internal message.

Message field table 94, message map table 97 and field switch table 95 direct the MGR through a process in which iterative tables are looked up to find the proper locations to place the data from the raw message into the new ISO message. The table records also cause the data from a field in the raw message to be converted to a different data value if required to comply with the ISO format. As each field from the raw message is processed, the FIELD_NUM counter is changed. If the field switch indicator in a message field table is not used, the FIELD_NUM is incremented by the counter to the next field number. Alternatively, if the message field table record includes FIELD_SWITCH_IND, the FIELD_NUM is incremented to the FIELD_NUM value in the corresponding field switch table record. The field number identified is then similarly processed, using the message field table record for that INT_MSG_SID and FIELD_NUM.

The MGR carries out the parsing of the raw message and the construction of the new internal ISO message by building a cell array. The location of each field in the raw message in field 12 of the SME is represented by values in the message field table record having the INT_MSG_SID and corresponding FIELD_NUM value. The same table record provides the ISO_BIT data which represents where the data in the raw message field number is to go in the internal ISO message format (once the raw message data is converted in accordance with data in a corresponding field map table record if necessary). The MGR places this data in the array of cells in an order that corresponds to the fields of the standardized internal ISO 8583 message of the system.

The MGR operates to create this cell array of data in RAM. This cell array is used by an "ISO create" function to generate the new message in the internal message format. As shown in FIG. 13 an MGR ISO array 93 includes cells with the data from each field in the raw message transformed through conversion of field values in accordance with the field map table records and rearranged in accordance with the field switch table records. Each cell of the MGR ISO array 93 includes not only the field data but also other data from the message field table records 94. This data generally includes the ISO_BIT_SID, VAR_LEN_SID, VAR_LEN_ENCODE_SID, VAR_LEN_CNT_SID and DATA_FMT_SID. For data in private fields the data includes the ISO SUBFIELD_SID and the corresponding information from the corresponding message subfield database table records. This data is representative of not only where the data goes in the internal message, but also can be used to derive information on how the MGR ISO array data is presented in the internal ISO message format.

Once the MGR ISO array 93 is completed the MGR executes the "ISO create" function. The ISO create function takes the message format data in the cells of the MGR ISO array 93 and looks up ISO field table records 91. The ISO create function of the MGR conventionally uses a FMT_SID value of "0" in the preferred embodiment in matching the ISO field table records to create the new internal message. By successively matching the data in the ISO field table records to the data in each of the cells, an ISO_DATA_LEN value for each cell can be located. This is indicative of the length the corresponding field is to occupy in the internal ISO message.

From the ISO field table records the ISO create function of the MGR determines the field length for each field in the new internal message. It then compares the field length to the message data in the array 93. If the length matches, the data may be directly used in the new message. If the data length does not match the ISO create function buffers or converts the particular data field in accordance with its programmed logic based on the differences and operates to modify the message field data in the cells of the MGR ISO array. This is represented by the initial buffering of the message field with zeros in FIG. 13. Of course the "location" of the message field from the raw message has been changed in accordance with the message field and field switch table records. Further, although the raw message data is shown unchanged in FIG. 13, it should be understood that the raw message data is often transformed or converted to another format or value in accordance with the field map table records.

The MGR includes a number of programmed procedures that are used to convert data from one form to another. This may include procedures that convert data values or formats in the raw message to those required for the ISO message. The procedures for converting data are generally a fixed part of an MGR and as later described are also used for converting internal message data to external formats.

The ISO create process in the MGR converts the entire MGR ISO array into an ISO 8583 message. The SUBFIELD_SID data is included with the private field data in the new message. Of course, if an error occurs while the raw message is being transformed to the new message, the MGR proceeds to generate an error message. The error message may be transmitted to the APMS 62.

The MGR also operates to update the information in fields 1 through 11 in the SME header and to place the header data in a header array in the MGR. The MGR carries over the values in fields 1 through 11 from the line driver except that it changes field 7 to indicate the message is now in an internal data format. It also adds the processing time to field 9. This is the total time spent by the system processing the message since the original message was received from terminal 68. The MGR adds its processing time to the existing value in the field. The MGR also places its NODE_SID in field 10 of the header.

Figure 23:
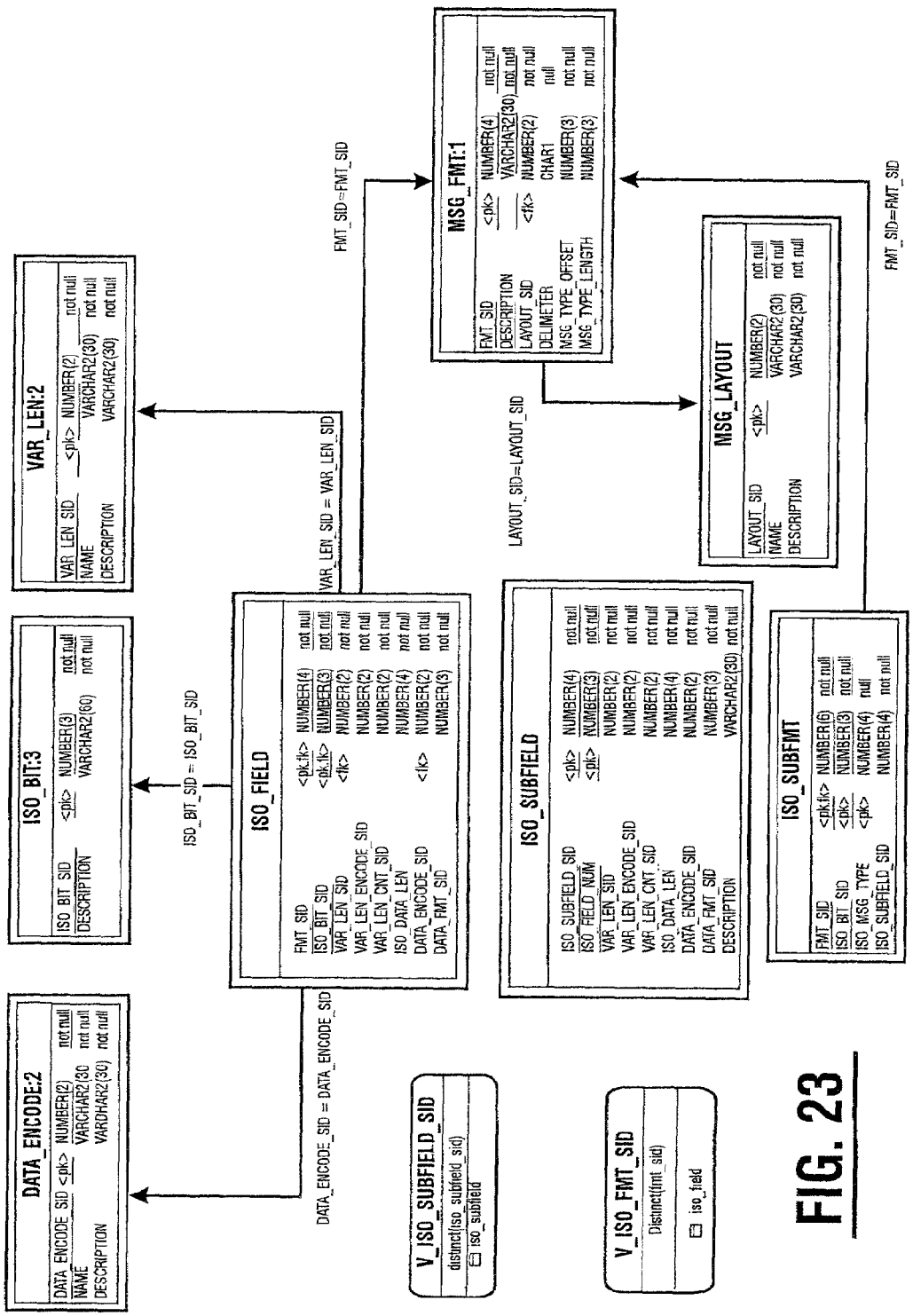
FIG. 23 is a partial database schema associated with FIG. 22 for use with parsing and constructing ISO format type messages in the financial transaction processing system.

The layout of the message field, field switch, field map and ISO field table records which are involved in parsing and converting a raw message format to a standardized ISO 8583 message format is represented by the partial database schemas shown in FIGS. 22 and 23. It should be noted with regard to FIG. 23 that there are ISO subfield table records which provide the ISO create function with the information necessary to put data in private fields in the standardized internal message format.

The Sender

If the MGR completes its processes successfully, a new internal ISO message is created. This message includes the header with fields 1 through 11 in FIG. 3 and a message text in field 12 which is in a standardized internal ISO 8583 format. Fields 1 through 4, 7 through 10 and 12 are filled in at this point and the remainder are zeros. Field 11 is filled in if the component originating the message is part of a line group. This new message is sent to a sender 96 which is a software component associated with the MGR as shown in FIG. 4. The function of the sender is to determine the next destination for the message in the system. In this case the sender derives the IP address and IP port for the MPP that can process the message within the system.

Figure 14:
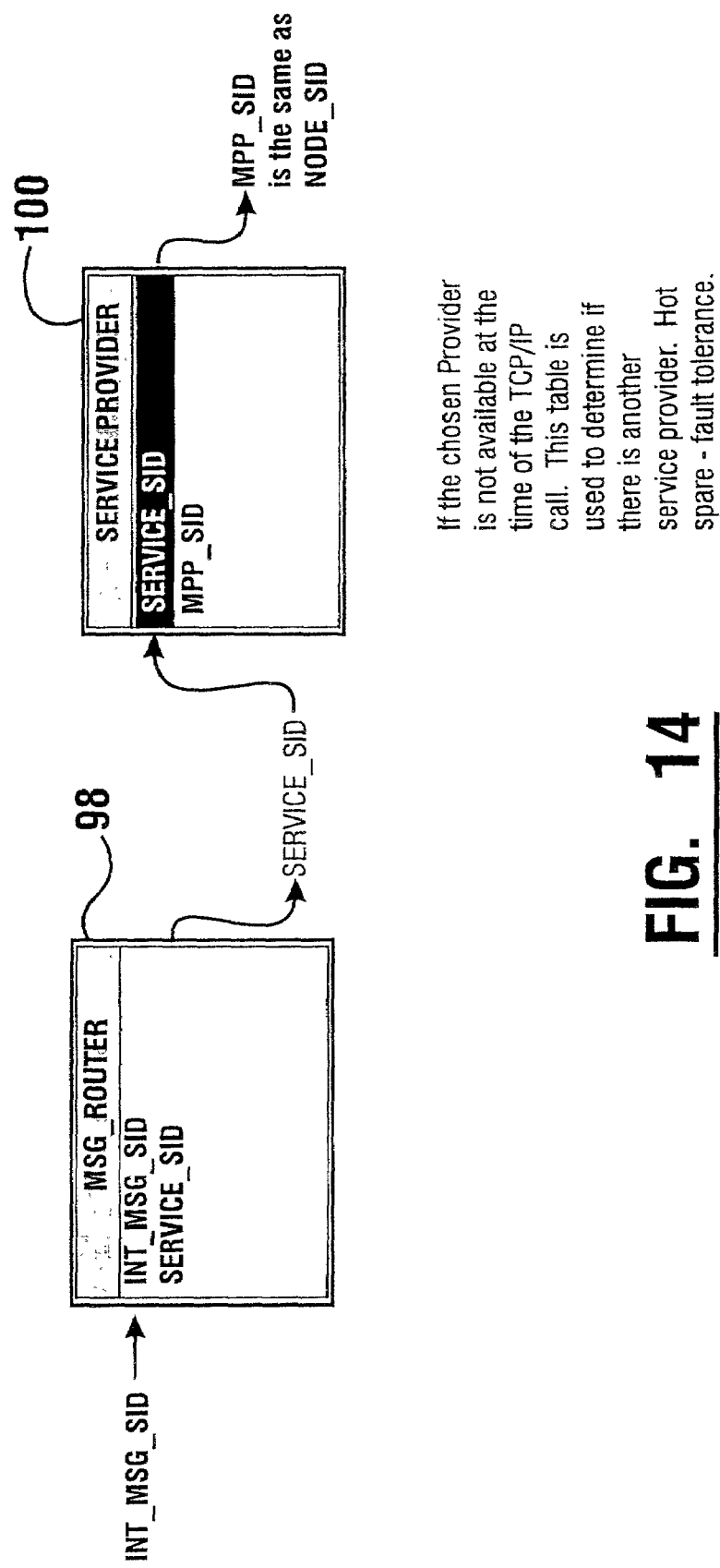
FIG. 14 is a schematic view of a message address being determined after a message has been parsed and reconstructed by the message gateway router.

This is accomplished by the sender taking the INT_MSG_SID from field 4 in the header of the new message. The sender then goes to the database information in shared memory and finds a message router table record which contains this information. This is demonstrated schematically in FIG. 14 by message router table 98.

By finding the message router table record including the INT_MSG_SID value, the sender can determine a SERVICE_SID from that record. The sender places the SERVICE_SID value in field 5 of the SME header. The sender then takes the SERVICE_SID value and looks for a service provider table record schematically indicated 100 in FIG. 14 which includes this entry. From the service provider table record the sender determines an associated MPP_SID. The MPP_SID corresponds to a node SID. In this case because it is associated with an MPP it is a node type process table record. Table portions 88 and 82 as shown in FIG. 21 show the data contained in an MPP node table record.

The sender associated with the MGR also puts the MPP_SID value determined from the service provider table 100 into the header of the message. It is inserted in the target node SID which is field 6 of the header. This is done to provide an indication within the message of the target address for the message. As a result the fields 1 through 12 of the SME are now filled with data, except field 11 is blank when the terminal which originated the message is not part of a line group.

Figure 29:
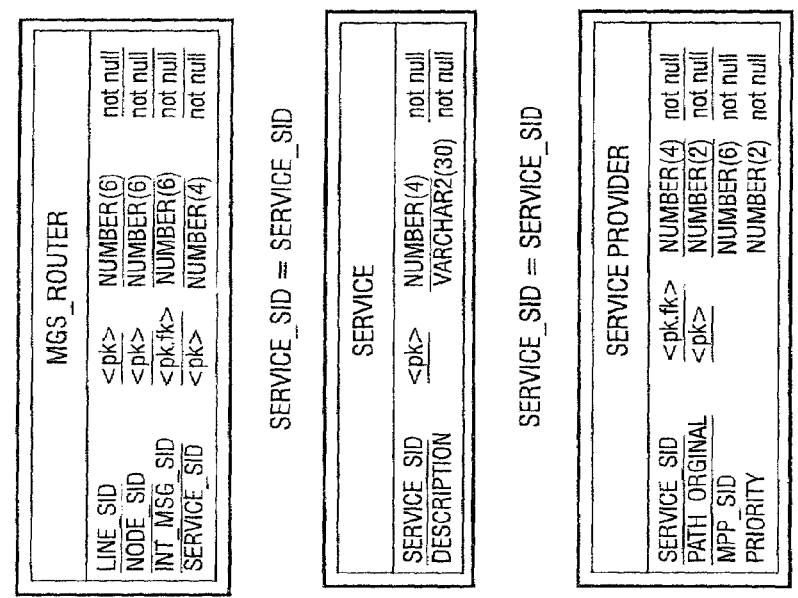
FIG. 29 is a partial database schema used in connection with routing messages to a message processing program within the system of the present invention.

The data contained in the message router and service provider table records is represented by the partial database schema shown in FIG. 29. As shown in the MSG_ROUTER table, the INT_MSG_SID is used to determine a SERVICE_SID which is then used as a present key to the SERVICE_PROVIDER table to find the MPP_SID which is the node address of the MPP which is capable of processing the message having the particular INT_MSG_SID value.

Figure 15:
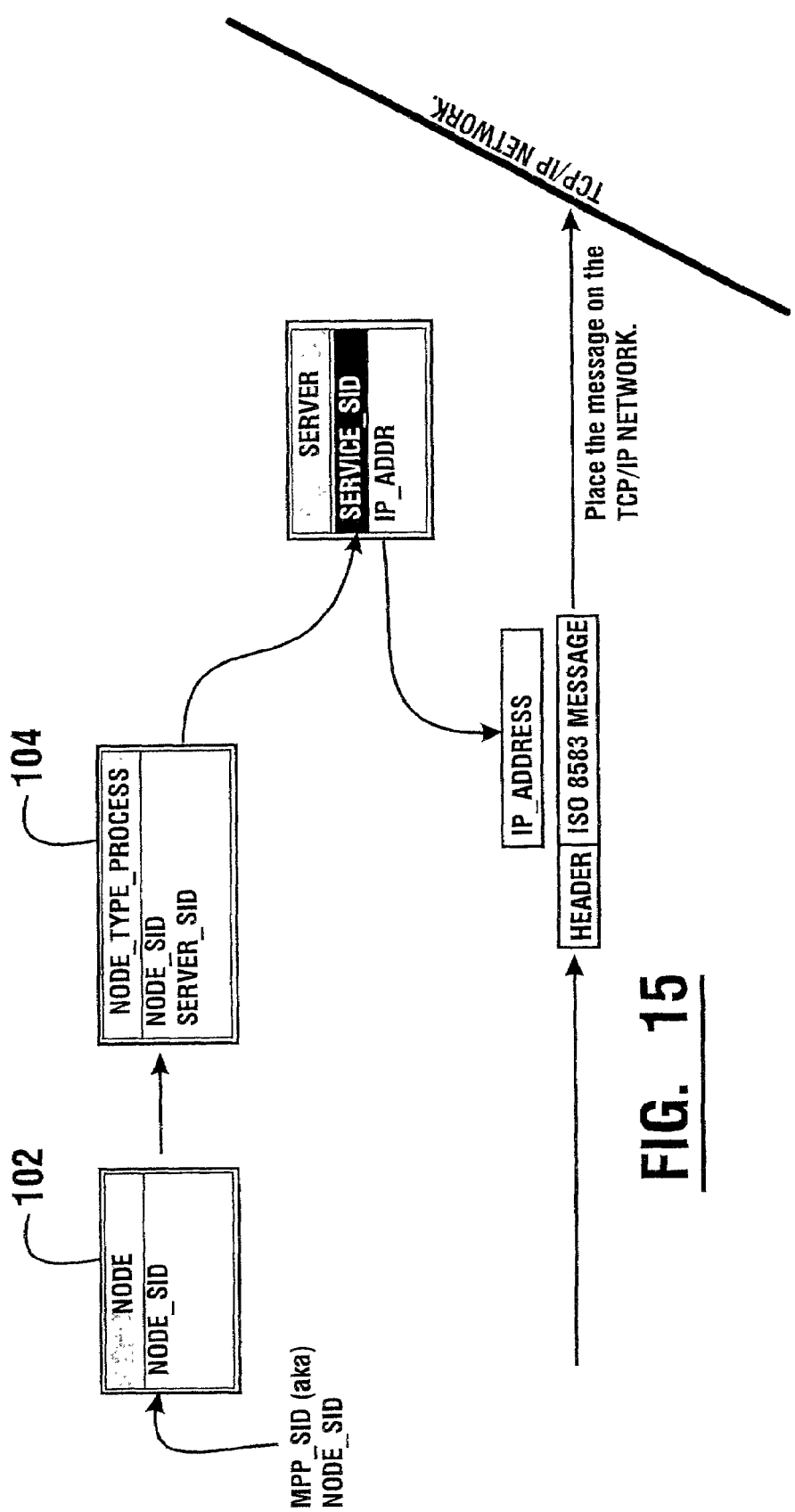
FIG. 15 is a schematic view of a message from the message gateway router being addressed and transmitted within the financial transaction processing system.

The sender associated with the MGR uses the MPP_SID to find where to send the message. The MPP_SID is a NODE_SID for a node type process node, which is schematically indicated by node table records 102 and 104 in FIG. 15. As this node has a node type process table record, a SERVER_SID value is retrieved from the table record by the sender.

The SERVER_SID value points to further data which is used to determine the IP address and port ID of the particular MPP. The determination of the SERVER_SID is demonstrated by the partial database schema in FIG. 21. This is shown in the table portion 88 which has the SERVER_SID as the third column in the table. The database schema includes a SERVER_SID value in connection with the NODE_SID which identifies the system address of the particular MPP target node that can process the message.

The sender uses the SERVER_SID value to determine the IP address and IP port ID of the required MPP so that the message may be sent to that MPP through the TCP/IP network. The sender goes to the database information in the memory and finds a server table which includes that SERVER_SID value from the node table record. The server table is partially graphically represented 106 in FIG. 15. From the server table the sender retrieves the IP address designated IP_ADDR in the table. The IP_PORT_ID is known from the node type process table record. Using the application programming interface ("API") associated with Unix, or other operating system being used, the message is sent through the TCP/IP network to the designated IP address and specific IP port ID.

The process of finding the IP address from the SERVER_SID is graphically demonstrated with respect to the partial database schema in FIG. 24. As shown therein the server table records provide a correlation between the SERVER_SID key and the IP_ADDR. This combined with the IP_PORT_ID from the node table record enables deriving the proper address for the message.

Message Processing Program ("MPP")

Figure 16:
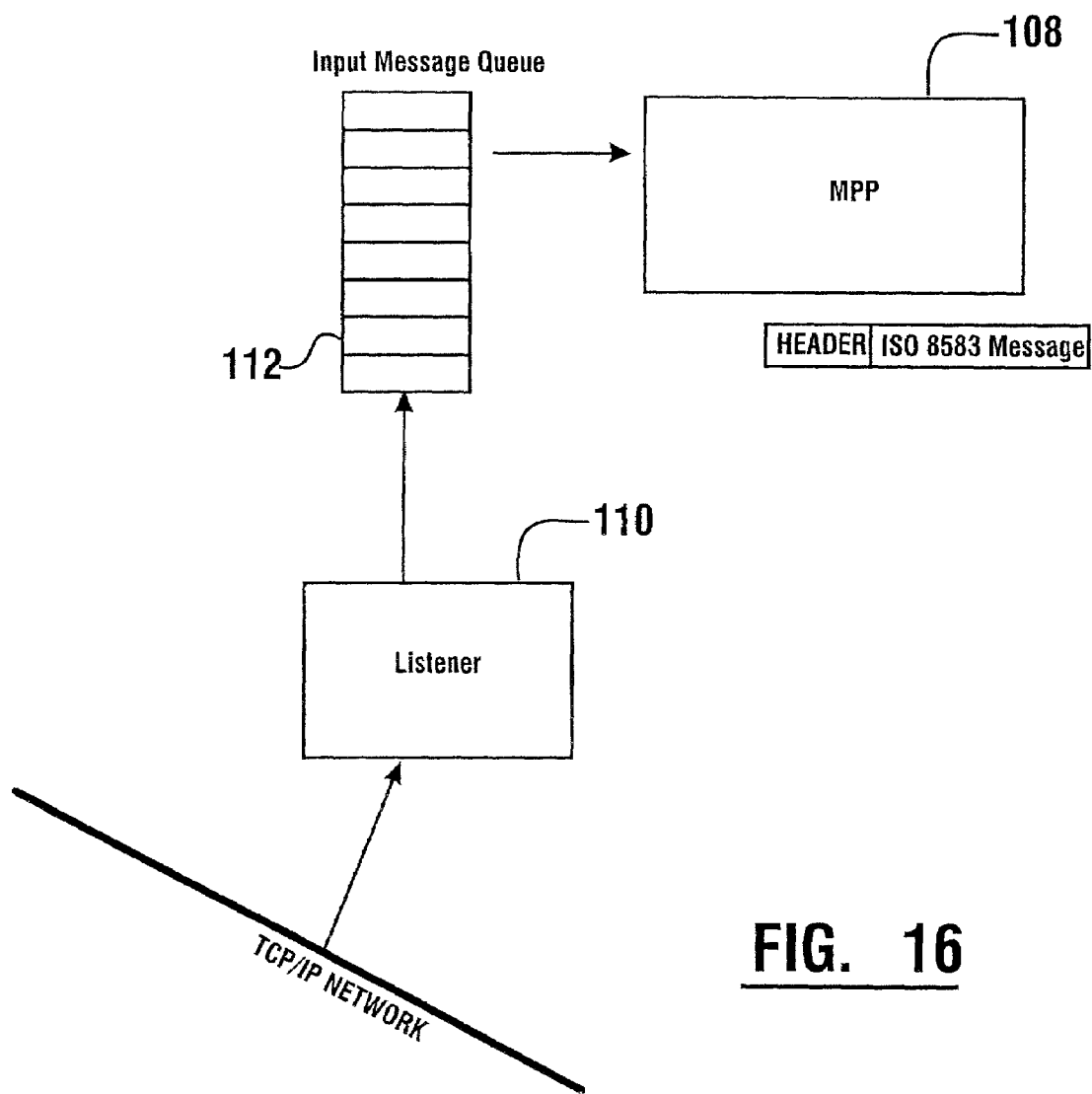
FIG. 16 is a schematic view of a message being received by a message processing program of the financial transaction processing system.

As shown schematically in FIGS. 5 and 16, an MPP 108 which is the target of the message has a listener 110 software component associated therewith. The listener functions to receive messages sent to the port ID for that MPP listener at the IP address and to pull the packets of the message back together from the TCP/IP network. Listener 110 then puts the message in the MPP's input queue designated 112 in FIG. 16. It should be remembered that this message, although switched through TCP/IP, is placed back in the queue 112 in the format shown in FIG. 3 with the message text in field 12 in the standardized internal ISO 8583 message format. It should be understood that the MPP may reside on the same computer or on a different computer than the MGR which dispatched the message.

MPP 108 is a software component that is designed for specifically handling the type of message that it receives. Commonly the first step that MPP 108 will accomplish is to create an ISO field array from the message. This is graphically demonstrated with regard to FIG. 17. The MPP takes the ISO 8583 message and parses it out into an array comprised of cells 114.

Each of the cells contains data in a field of the message as defined by the ISO Standard or data in a subfield defined for the internal ISO message format. It should be remembered that in creating the internal ISO message there may have been private field data or data that was not required to be in a particular field by the ISO 8583 Standard. This data was placed in the so-called "private fields" of the ISO 8583 message by the MGR.

The MPP 108 uses data from the ISO parsing table records shown in FIG. 23 to parse the message and place it in the cells of the array. The ISO message in field 12 of the SME is in the ISO 8583 format. It includes bit maps as defined by the Standard for indicating the presence or absence of data in the 128 fields which make up the ISO message. The MPP operates to hold the message in a buffer and to parse that original message and copy it into the cells of the array based on the ISO data length values stored with the corresponding ISO bit sid values in the ISO field table records. The ISO field table record layout shown in FIG. 23 demonstrates the stored relational data. It should be understood that the FMT_SID value for the table records used in this case is "0" which is the value for an ISO format message in the system.

The MPP executes a routine that iterates through the 128 fields of the ISO message. As the length of each field of the ISO message is determined the MPP copies the data from the original message in the buffer and places it in the corresponding cell of the array.

Figure 17:
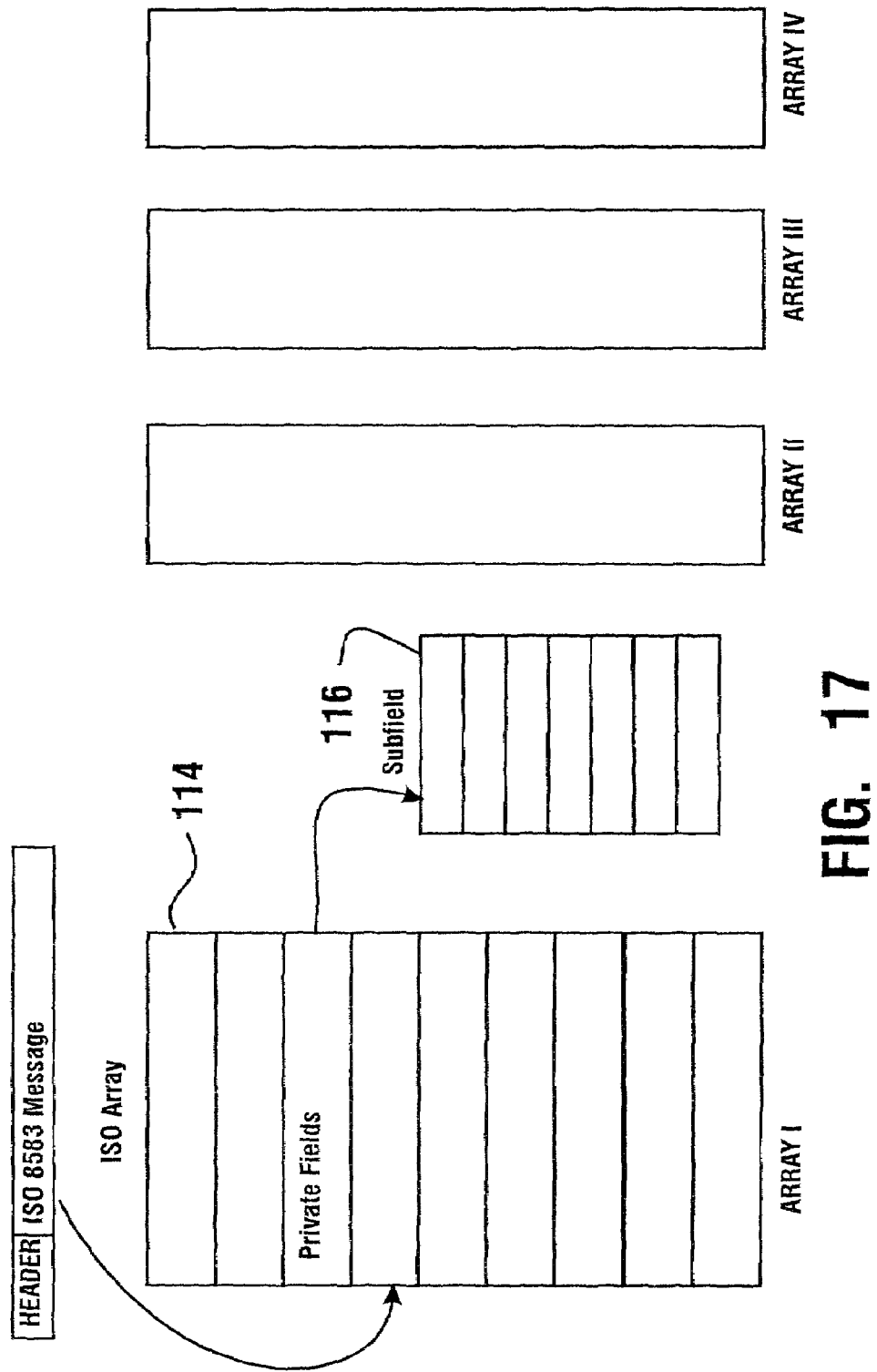
FIG. 17 is a schematic representation of a transaction message being laid out in an array of defined cells in the message processing program represented in FIG. 16.

Subfield data is laid out in subfield cells 116 as shown in FIG. 17. The ISO_SUBFIELD_SID values placed in the private fields with the data by the MGR correspond to data in ISO subfield table records that define the field number and length for each item in the private field data. The ISO subfield tables define the location and length of each subfield in a private field. The MPP executes a routine similar to that used with the non-private fields that goes through each subfield in a private field and places the data in the subfield cells of the array.

In the preferred form of the invention the MPP includes multiple cell arrays. This enables processing data from one array and storing the result in other arrays. This approach enables using the data in the first array again after it has been previously used for processing. In the preferred form of the invention the MPP includes four cell arrays. This is shown schematically in FIG. 17. Of course in other embodiments other numbers of cell arrays may be used.

MPP State Flow

The MPP functions to process an incoming message and to generate a new message. This processing of a message by an MPP may involve, for example, a request to authorize a financial transaction and generating a message in response. This response message would typically allow the transaction to go forward, or to deny the transaction. In this example the MPP would be generating a return message which is routed back to the originating terminal device. Alternatively, the MPP may perform processing on the message and then send the resulting message through the system for eventual transmission to an external network or other external authorizing system.

Figure 18:
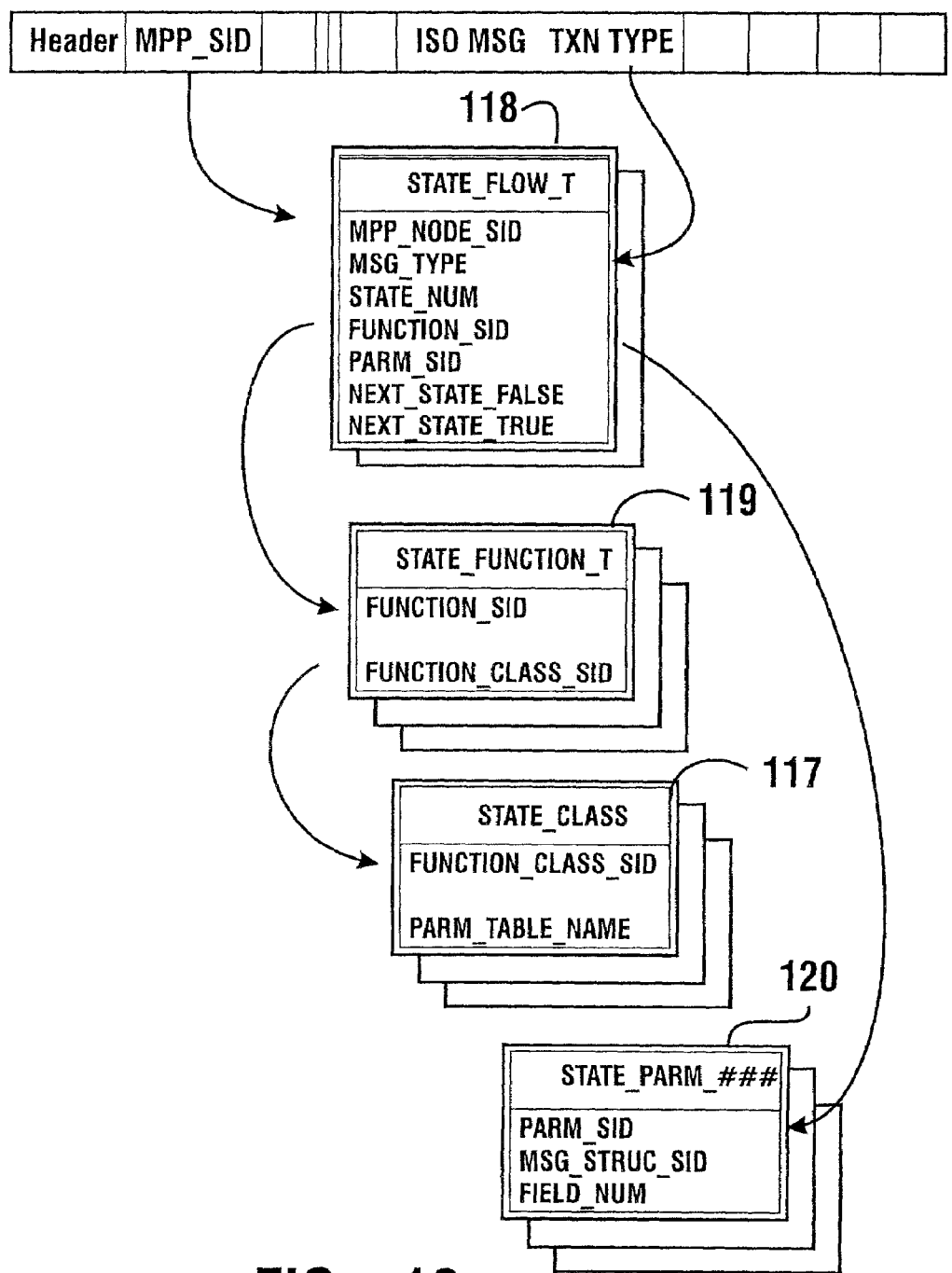
FIG. 18 is a schematic view of a message being processed within a message processing program of the financial transaction processing system of the present invention.

When the MPP performs processing it does so using a state flow process. This process is graphically demonstrated with regard to FIG. 18. The ISO 8583 message which has been mapped into an ISO array includes by definition a message type identifier field which indicates the transaction type and message type that the particular message represents. This is a requirement of the ISO Standard. The MPP takes the MPP_SID from field 6 of the header and the ISO defined message type identifier out of the field cell in the array and uses them to determine the processing steps that the MPP 108 is to go through. Because there may be several processing steps, the MPP also sets a counter to a first state number. This counter, which may be set initially at "one" but may be initially set at any other number depending on the design of the system, is called a STATE_NUM parameter.

To determine what to do with the message, the MPP takes the message type which is designated MSG_TYPE, the STATE_NUM and the NODE_SID for the MPP to the database table records held in shared memory. The MPP finds a state flow table record 118 including these parameters as graphically indicated in FIG. 18. From the state flow table record the MPP determines a FUNCTION_SID and a PARM_SID. The FUNCTION_SID is then used to find a state function table record 119 by matching this data. From the state function table record a function class can be determined which is designated FUNCTION_CLASS_SID.

The FUNCTION_CLASS_SID is then used to find a state class table record 117. The state class table record provides the name of the parameter table which provides the parameter to be processed designated PARM_TABLE_NAME. The PARM_SID from state flow table record 118 is then used to go to a STATE_PARM_TABLE graphically indicated 120 in FIG. 18, determined from table record 117 and having that PARM_SID. The state parameter table 120 may include a field number value designated FIELD_NUM which corresponds to the field bit number in the ISO message data in the cell array which contains the data that is to be used in carrying out the particular steps associated with this FUCNTION_SID and STATE_NUM. The state parameter table may alternatively point to other data or can provide data to be used which is not in one of the cells of the original array.

Having the field bit number for the data in the original ISO array (or the source of other data) that is to be used to carry out the function, the MPP then operates to execute a desired function on the data. This is done within the coding of the system which includes a wide variety of functional operations that may be executed with data from the fields in the message. These operations can be selectively pointed to by the FUNCTION_SID and STATE_NUM data in the state flow table records. The MPP operates to execute the function with the data in the field from the ISO array (or other source) that is determined from the state parameter table 120.

The functions that are executed by the MPP using the field number data from the ISO array are designed to give a "true" or "false" response. A simple example of this may be the situation where the determination of whether the card being used by a customer initiating a transaction has expired. To check whether the card has expired the state flow table points to the state parameter table which includes the field bit number in the ISO 8583 message cell array which points to the cell where the expiration date of the card is contained in the cell array. The function called in response to the FUNCTION_SID and STATE_NUM compares the expiration date to the current date and returns an answer to the question of whether the card expiration date is beyond the current date. If the card is not beyond the expiration date the answer is "true". If the card is beyond the expiration date the answer is "false". The state flow table record 118 provides the next state number to be used by the MPP if the response is true as well as a new state number to be used if the answer is false. These are shown by the designators NEXT_STATE_TRUE and NEXT_STATE_FALSE in table record 118.

In response to receiving the result of the executed function, the STATE_NUM designator is changed to the STATE_NUM that pointed to by the true or false response. The new STATE_NUM is then used to look up a new state flow table record which corresponds to the NODE_SID of the MPP and MSG_SID which are the same as before, and the new STATE_NUM. Looking up the function class and parameter table data from the state function and state class table records respectively, points to a new state parameter table record which contains the PARM_SID. This table points to the FIELD_NUM of the ISO 8583 data (or other data) which is to be used in carrying out the next step. As before the FUNCTION_SID and STATE_NUM are then used to identify a new function to be executed in the code.

This new function will return a result that is either "true" or "false". The true or false return determines the next STATE_NUM which is then used to repeat the process by looking up yet another state flow table record. The process repeats until all of the functions to be carried out by the MPP through the state flow process have been executed.

It should be noted that the processes in the code which are called by the FUNCTION_SID and STATE_NUM may include functions that access the database 32. These may include functions which look up, compare, modify and replace database information.

An advantage of this approach is that the state flow table records point to the functions to be executed. As a result, these common functions are used over and over again when called. They do not have to be rewritten or incorporated into a different program when a new situation requiring a similar function is to be added to the system. This enables selecting from existing functions and configuring states and flows to accomplish processing transactions. This approach avoids the need for conventional programming.

The ISO cell array containing the original message is also used during the state flow processes which are carried by the used MPP 108 to produce resulting data which is stored in the other cell arrays of the MPP. Resulting data is moved into cells of the MPP arrays in accordance with the configuration of the MPP. STATE_PARM table records include MSG_STRUC_SID values which designate the cell arrays in the MPP. Because the ISO 8583 message has up to 128 fields that can be used to hold transaction data, data in a significant number of fields may be changed through the state flow processes. As a result of these processes new message data is generated by the MPP in the cells of one of its ISO cell arrays. This array which contains the final resulting message generated through the state flow processes carried out by the MPP is schematically shown as Array IV in FIG. 17.

Figure 25:
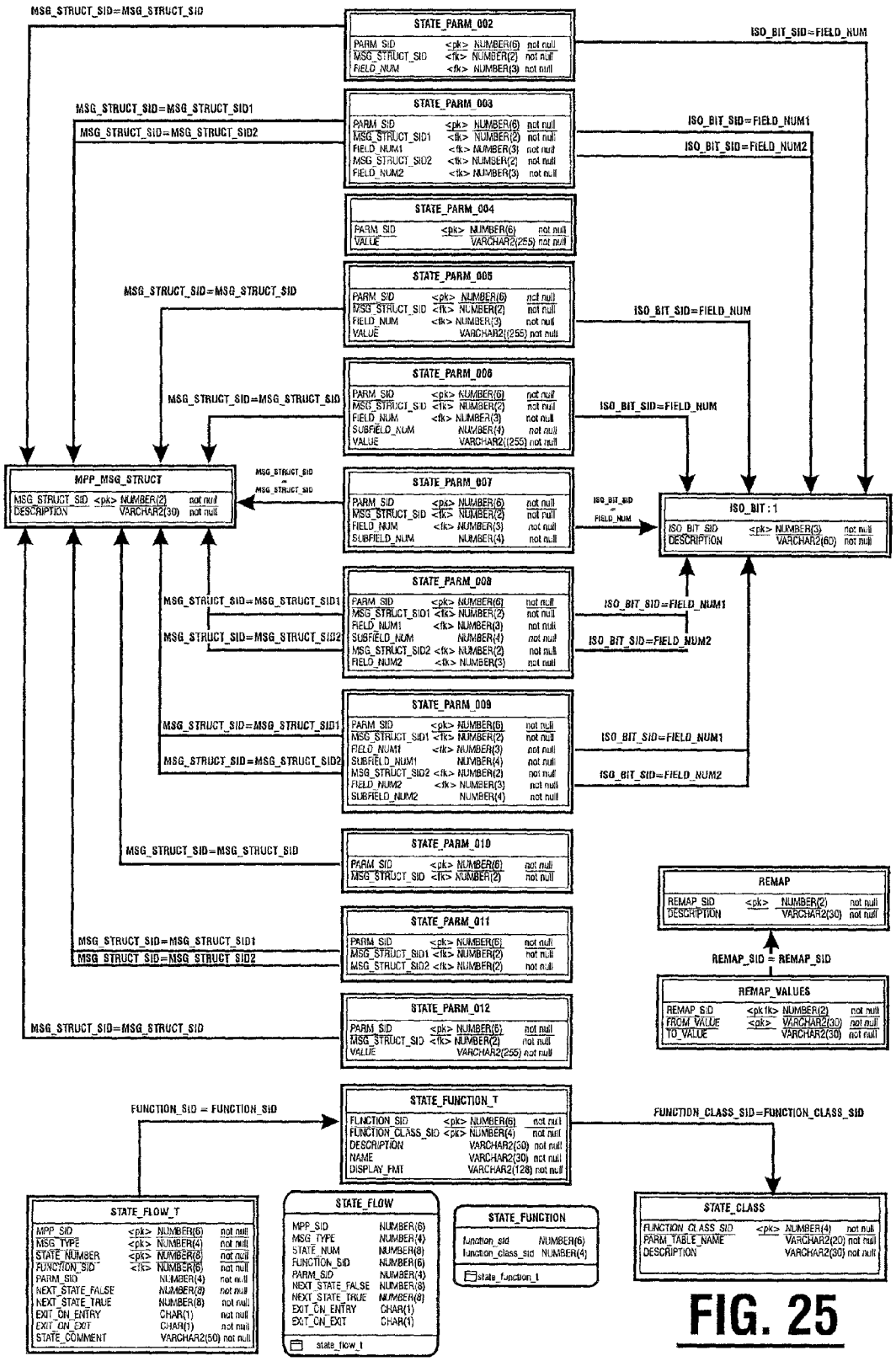
FIG. 25 is a partial database schema graphically representing steps for processing financial transaction messages within the message processing program using a state flow process.
Figure 26:
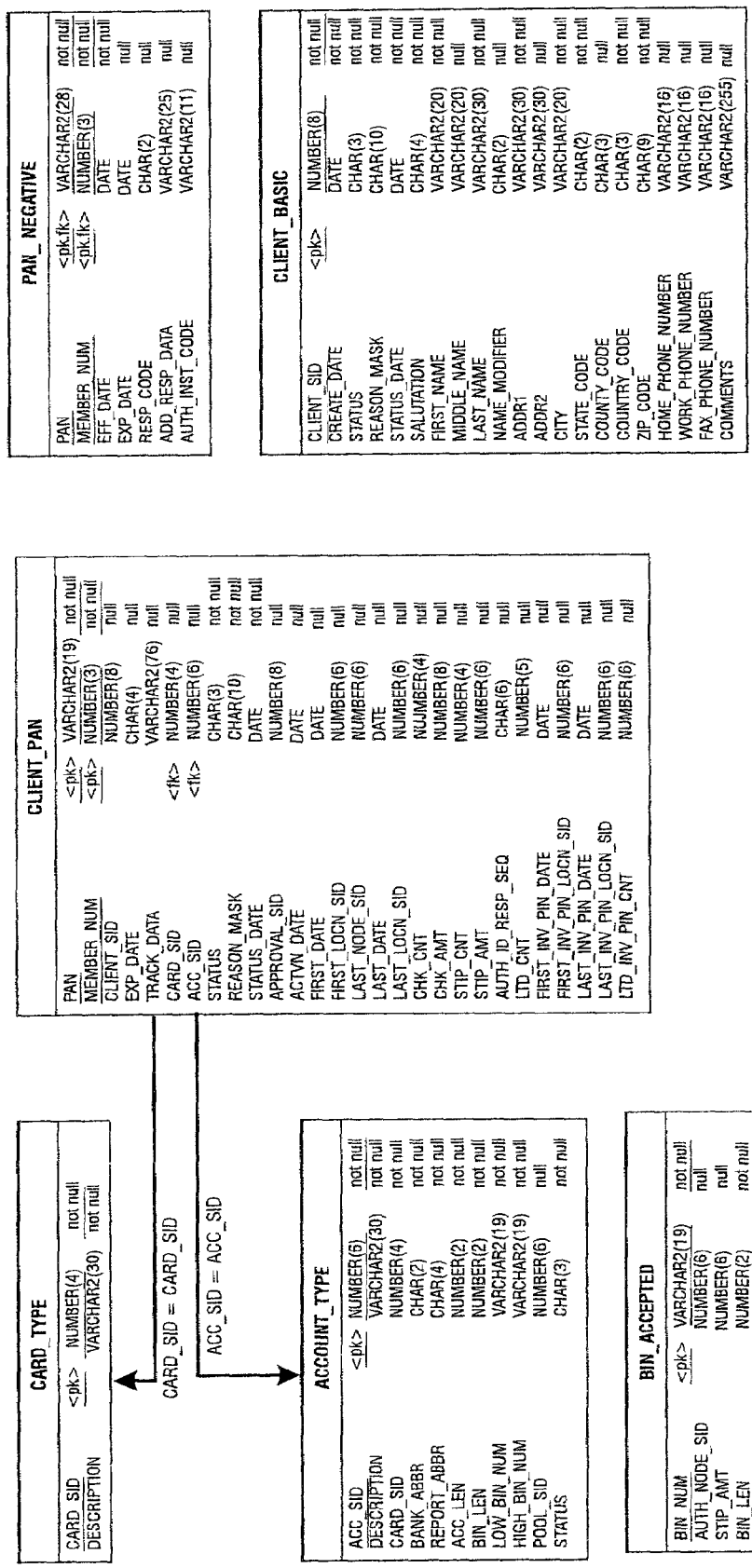
FIG. 26 is a partial database schema used for determining the destination of transaction messages that are passed from the system of the invention to an external authorization system.

The state flow processes of the MPP are represented by the partial database schema shown in FIG. 25. The Figure shows a state flow table designated STATE_FLOW_T which is the layout of table records which include a particular MPP_SID, MSG_TYPE and STATE_NUM. A state function table is STATE_FUNCTION_T and a state class table is STATE_CLASS. The various STATE_PARM tables show different types of field designators and other information that correspond to the PARM_SID determined from a state flow table record. The STATE_PARM tables also control the placement of resulting data in the cell arrays of the MPP. Of course, as previously discussed there is a different state flow table record for each state number for a given MPP_SID and message type.

The MPP 108 must also derive information concerning where to send the message next. For purposes of this example, we consider a situation where a transaction message is eventually going to be transmitted to an external network for authorization. The identity of the network can be derived by MPP 108 through association with data in the primary account number ("PAN") within the ISO 8583 message. The process of deriving the address of the ultimate system node where the message can be processed is done by the MPP 108 and is demonstrated schematically with reference to FIG. 30.

Card based financial transaction messages in the ISO format include the PAN associated with the card used in connection with the transaction. The PAN includes a PAN prefix. The PAN prefix contains information which can be used to derive information on a particular entity which can authorize a transaction. This is a convention that is established by standards first adopted by the American Banking Association. Unfortunately, the PAN prefix generally varies between four and six digits for financial transactions in the ISO 8583 format.

Figure 30:
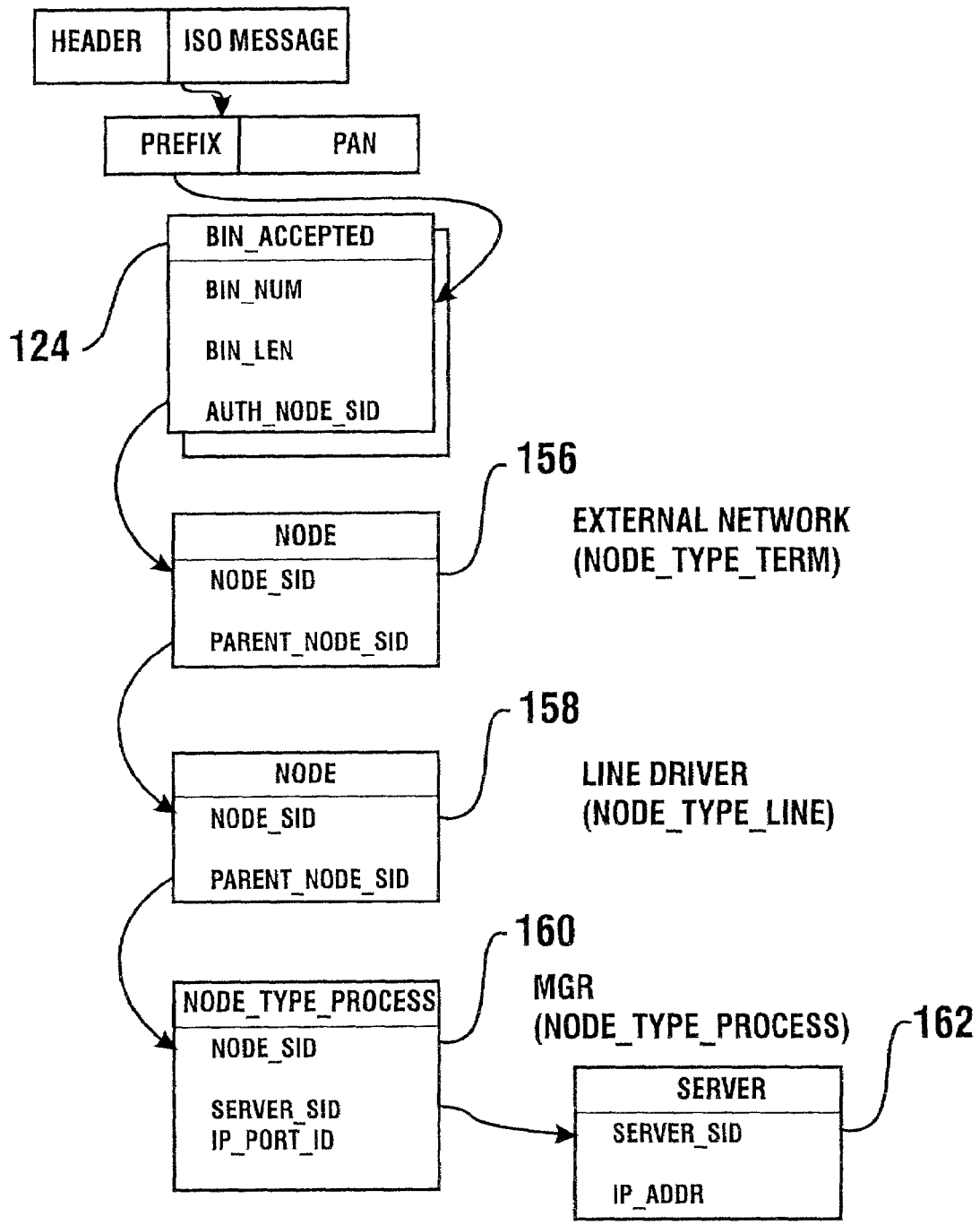
FIG. 30 is a schematic view of the process steps used in connection with routing messages from a message processing program to a message gateway router within the system of the invention.

To begin derivation of information on a system node representative of where the transaction can be authorized, the largest PAN prefix (six digits) is copied from the PAN and compared to columns in a series of BIN_ACCEPTED tables indicated 124 in FIG. 30. The PAN prefix is designated the parameter BIN_NUM. Each BIN_ACCEPTED table record 124 includes a BIN_LEN parameter which corresponds to a particular PAN prefix that identifies an AUTH_NODE_SID. The AUTH_NODE_SID is the node of the system which corresponds to the authorizing entity.

The MPP begins by iteration through the BIN_ACCEPTED table records looking for a match on the initial assumption that the PAN prefix is six digits. It first runs through all the BIN_ACCEPTED tables with BIN_LEN parameters of six digits. If no match is found, one digit is dropped from the PAN prefix (BIN_NUM) and all the table records having a BIN_LEN of five digits are checked. Again, if no match is found a digit is dropped from the prefix and table records having BIN_LEN of four digits are checked. The process can be continued with three digits and so on if such BIN_LEN values are used in a particular system.

When a BIN_ACCEPTED table record is found in which the BIN_NUM (PAN prefix) and BIN_LEN (authorization designator) match, the table provides a NODE_SID of the ultimate node for the entity that can authorize the transaction. This AUTH_NODE_SID is the NODE_SID in the system for the external third party authorization network. This NODE_SID value is placed by MPP 108 in one of the cells of one of its arrays. In this example MPP 108 uses this ultimate target node value for routing the message that is produced by the MPP as later explained.

The processes carried out in MPP 108 creates a new ISO message array. This is a new message with a new header. A new message is preferably put together from the data in the cells in Array IV of the MPP. The header in fields 1 through 11 of the SME is built by MPP 108 using state flow processes. The MPP includes a "create header" function which generates the new data for the header fields.

For purposes of this example the new message generated by the MPP 108 is one that will ultimately be sent to an external authorization system or network. This is commonly done where the external network must authorize the financial transaction. Generally, the data format used by the external network for its messages will be different from the message format used by the terminal 68 that originated the first transaction message and the SME format used within the system of the present invention. The method in which the new message from the MPP 108 is later processed and converted to the format used by the external network is later discussed in detail.

The new SME format message generated by the MPP 108 has generally new data in header fields 1 through 11 compared to the message that the MPP received from MGR 24. The data in field 1 is the header layout version as shown in FIG. 3. The data in field 1 of the new message will be the same as in the received message because as previously indicated, only one header layout is used in the exemplary system described herein.

Field 2 is the SOURCE_NODE_SID for the system node originating the message. Because MPP 108 has generated a new message, the node sid value associated with MPP 108 is inserted in this field.

Field 3 is the message receive time for receipt of the message by the system. As MPP 108 has built a new message, the current time is inserted in field 3 by the MPP.

Field 4 contains the internal message sid of the new message. Because the MPP is defined as creating a particular type of new message, the INT_MSG_SID of the new message is known. The INT_MSG_SID value for the new message is a function of the message type and format. The message type is part of the ISO format data in field 12 of the SME and the message format is the ISO format used internally by the system. The INT_MSG_SID value is available from database records associated with each type of ISO message. As a result, the MPP can derive this value or can be configured to insert the value to save processing time. It should be remembered that this INT_MSG_SID value here is for the message in the SME format that is moving toward an external authorization network. This message will be converted to an external format before being sent.

The MPP 108 also derives the SERVICE_SID of an MPP that can next process the new message. The MPP 108 also has available the TARGET_NODE_SID value of the external network which will receive the new message. This data can be used to complete the data that is needed for fields 5 and 6 of the SME header.

MPP 108 is configured to produce a particular message which will go to a particular external network or system. This ultimate target node sid has a node type terminal table record in shared memory as shown in FIG. 21. The MPP 108 finds the OUT_MSG_FMT_SID for the table record of the ultimate target node. As graphically represented in FIG. 21 this is the eighth column in table portion 82.

The MPP 108 then takes the message type for the new ISO message it has generated. The MPP goes through the message map tables in shared memory which have the OUT_MSG_FMT_SID of the external network (ultimate target node). The MPP finds a message map table record which has the MSG_TYPE of its new message. This then provides the INT_MSG_SID value which corresponds to the message type being sent and the format used by the external network. (See message map table layout in FIG. 22.)

The MPP 108 then derives the SERVICE_SID for an MPP that can process the message that is going to the external network. This is done by the MPP 108 finding a message router table record which includes the NODE_SID for the external network and the INT_MSG_SID for the message the external network is going to receive. As shown by the layout of message router tables in FIG. 29, the table record with both of these values includes the SERVICE_SID of the MPP that can process the message. The SERVICE_SID value for this next MPP can be inserted in field 5 of the reader, or if the message is not going directly to an MPP, may be stored in a private field of the message in field 12 for later use. Storage for later use may be done where the message is first going to a timer component before the next MPP, as later discussed.

The NODE_SID of the MPP to which the new message generated by MPP 108 will be sent is now derived by MPP 108. As shown in FIG. 29, the service provider table record including the SERVICE_SID has the MPP_SID value which is the NODE_SID of the MPP which can process the new message MPP 108 has generated. This data can be inserted in field 6 of the message by MPP 108 as the "target node" for the message. Alternatively, the ultimate destination node can be designated as the target node sid in field 6. The setting of the "message direction" in field 8 allows two alternative routing approaches later discussed. However, if the message from MPP 108 is going to a timer before being sent to the next MPP, the target node sid value for the ultimate node can be placed in a private field in the ISO message in field 12 of the SME for later use in a manner that will be explained.

As is apparent from the above discussion, MPPs can generally be thought of as dealing with a particular external data format and the SME format. The MPP deals with incoming and outgoing messages of the particular format. The processing of messages by the MPP is determined by the message type and direction.

MPP 108 also completes the other fields in the header of the SME for the message it has generated. As indicated in FIG. 3, field 7 is the data format indicator for the source of the message. In this case the MPP is the source of the message so its field 7 data indicates an internal data source. This is true of all messages generated by MPP 108.

Field 8 indicates message direction. Message direction in the preferred embodiment is "1" for "in", "2" for "out" and "3" for "MPP to MPP". If the message is being sent directly to the next MPP, field 8 would be set to "3". If the direction is set to "3" the message will be routed based on the SERVICE_SID value in field 5 of the message. However, if the NODE_SID of the next MPP (as opposed to the ultimate target node) is placed in field 6 of the message the MPP sets field 8 to "1" and the message will be routed based on field 6 data.

Alternatively, if the message will be sent to a timer before going to a next MPP, the message direction would be set to "2" for "out". The MPP would put the NODE_SID of a timer in field 6 and the ultimate destination node would be stored in a private field in the ISO message in field 12. As later explained, the timer software component which enables asynchronous transaction processing is treated as an external device.

Field 9 is the processing time. This is additive from the time the original message from terminal 68 entered the system. In this example MPP 108 would add its processing time to the value in field 9.

Field 10 is the last processing node for the new message. The NODE_SID for MPP 108 is inserted by the MPP in this field.

As previously discussed, field 11 is used when the terminal which originated the original message is part of a line group. It is used to find the line driver which has picked up the line that the terminal dialed. In this example where terminal 68 is not part of a line group field 11 would be a zero value. In other examples where the terminal originating the message is part of a line group, the value in field 11 of the message generated by MPP 108 would be the same as the incoming message to the MPP.

It should be understood that MPPs are generally configured by the system operator. The user has the ability using the graphical user interface 66 and input devices associated with the computer to set the state flows which build the new message in a manner desired for the particular system. The user also has the option to take advantage of opportunities to shorten transaction processing times by saving values for reuse later in private fields in the ISO message in field 12 of the SME. This is done by defining a layout for table records for the subfield where the data is to be stored in particular message types. This is represented by the layout for ISO Subformat and ISO Subfield table records in FIG. 29. This data can then be used to achieve shortcuts by having the next MPP look for this data in an incoming message before taking steps to derive the same data.

Figure 19:
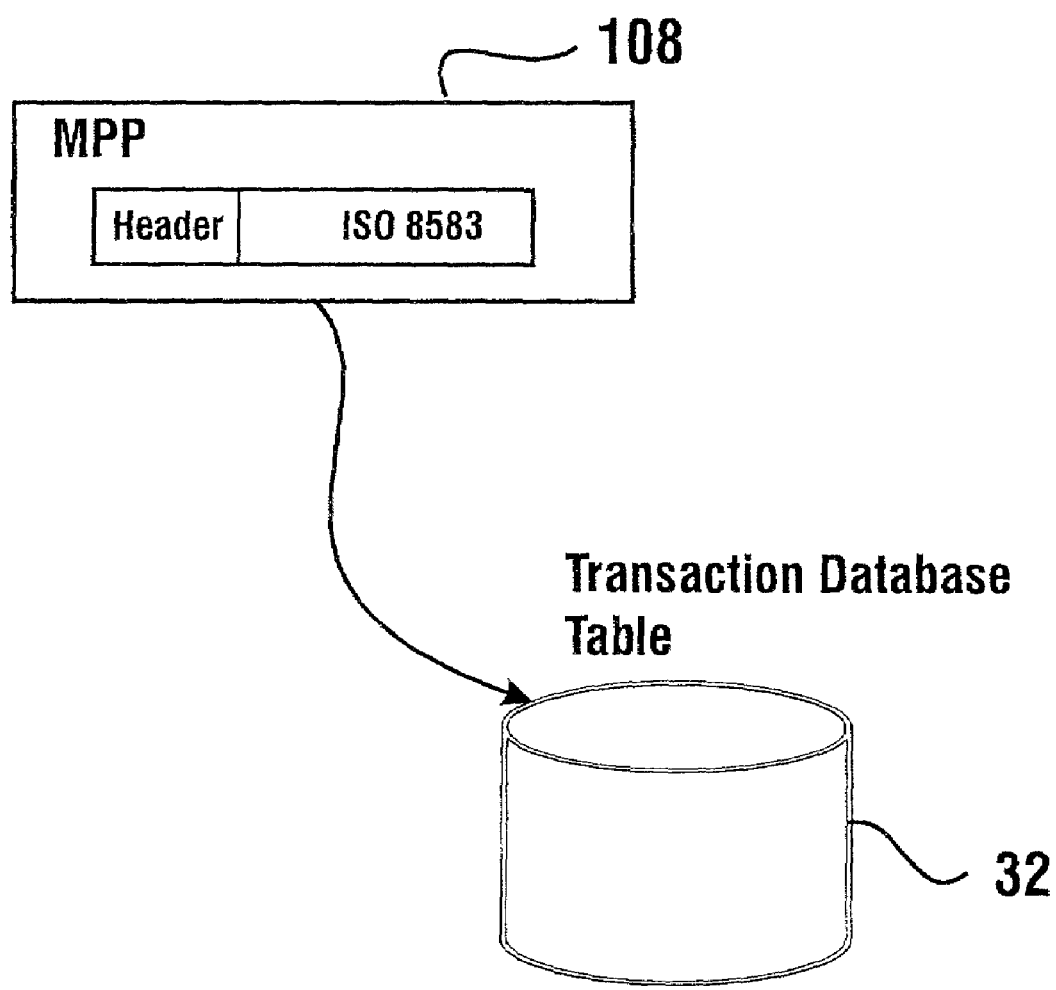
FIG. 19 is a schematic view of the process of storing a message in the relational database of the financial transaction processing system by the message processing program.

The MPP 108 also creates transaction records. A state in MPP 108 executes a "create transaction record" function in relational database 32 as indicated in FIG. 19. A transaction data file is maintained in the database to provide a record of transaction activity carried out by the MPP. This is preferably done through the use of imbedded SQL code which is linked directly with the MPP process in the database.

Transaction records are created by the MPP by configuring the state flow to put the data desired for the transaction record in one of the internal cell arrays of the MPP. The MPP then sends a message created from the values held in the cells of this cell array to the database for storage as a transaction record. In some embodiments it may be desirable to create more than one transaction record as the MPP does its processing.

The MPP 108 is also preferably configured to put transaction identifying information in the "echo back" field of the internal ISO 8583 message before sending it to the transaction record file in the database. This information in the echo back field can be used to distinguish this transaction message from all others. The character of the information placed in the echo back field of the message is developed to be compatible with how the particular external authorization system to which the message will be sent processes data in this field.

In the preferred embodiment the echo back field in any message responding to the original message can be correlated with the echo back field in the original message. This enables another MPP that receives a responsive message, to find the MPP that processed the prior message from the records in the transaction record file. The record stored in the transaction record file by MPP 108 preferably includes the originating the NODE_SID of the terminal that generated the initiating message.

The transaction record file also preferably stores records which include the NODE_SID and the SERVICE_SID value for MPP 108 with the identifying echo back data in the ISO message in field 12. As the storage of transaction record file data is controlled by state flow configuration within the MPP, the MPP can be configured to store separate records for the incoming messages it receives and the corresponding outgoing messages it generates. The MPP may also be configured to include data in the stored transaction records which can be used to correlate incoming and outgoing messages. This can be done by including data in a private field in the ISO message in field 12 of the SME that is separate from the "echo back" data from the external network.

It should be understood that message data stored in the transaction record file is determined by the configuration of the MPP. The user is free to insert data into the cells of one of the arrays of the MPP which is to generate the transaction record in the manner that is useful for routing transactions. Further, the user can configure the MPP so the transaction records contain only data which is desirable for routing or other purposes.

The Sender to Next MPP

As shown in FIG. 5 MPP 108 has a sender 122 associated therewith. Sender 122 operates to derive the address of the component in the system which will receive the message from MPP 108. The sender does this by deriving the IP address and IP port ID for the component in the TCP/IP network which will receive the message. All senders of components in the system have the same capabilities.

The sender generates the necessary routing data based on the data in the header of the SME. If the "message direction" in field 8 is set to "in" ("1") the sender will derive the next system address based on the "TARGET_NODE_SID" in field 6 of the header. If the message direction is set to "MPP to MPP" ("3") the sender will derive the next address based on the "SERVICE_SID" in field 5.

Figure 6:
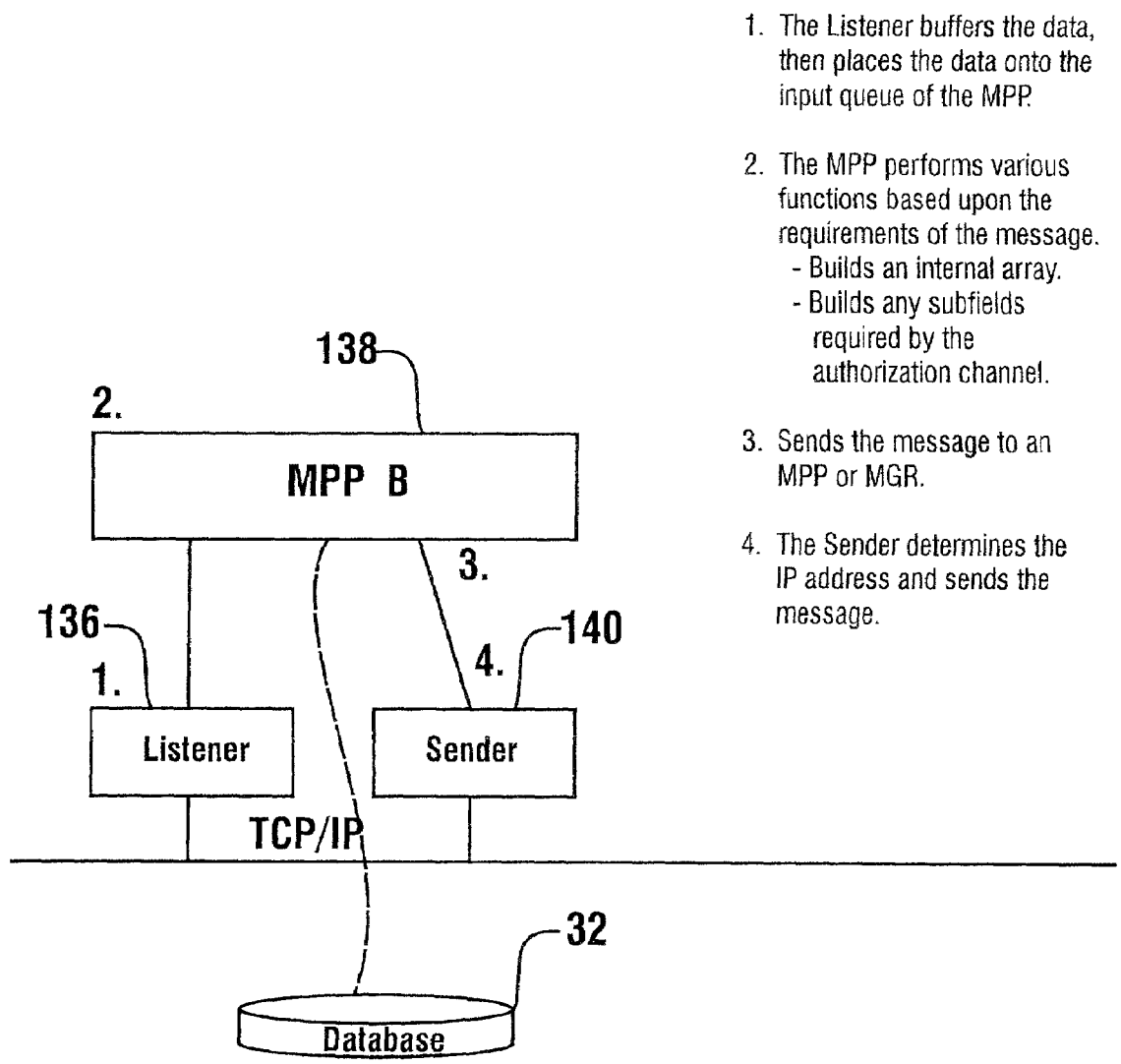
FIG. 6 is a schematic view of how a transaction message is further processed in a portion of the financial transaction processing system of the invention beyond the processing steps shown in FIG. 5.

As previously discussed, in embodiments of the system the message generated by MPP 108 will generally first be sent to a timer component before being delivered to a next MPP. This will be discussed in greater detail later and for streamlining this transaction processing example the message from MPP 108 will be considered as going directly to a next MPP 138 as shown in FIG. 6.

The sender responds to a "1" value in field 8 to derive the IP address and port ID for the target node sid value placed in field 6 by MPP 108. This is done by finding the corresponding NODE_SID table record which provides the SERVER_SID and IP_PORT_ID values for the next MPP. This is shown by table portion 88 in FIG. 21. The sender then finds the server table record including this SERVER_SID value. This table record includes the IP_ADDR value as shown in FIG. 24. The sender then dispatches the message from MPP 108 to that derived address.

Alternatively, in response to the message direction being set to "MPP to MPP", the sender uses the SERVICE_SID value in field 5 to determine the next system address. As shown in FIG. 29 the service provider table record with the SERVICE_SID value from field 5 provides the sender 122 with the NODE_SID of the MPP which can next process the message. Having found the NODE_SID value for the next MPP 138, the sender 122 executes the steps described above to find the IP_ADDR and IP_PORT_ID values for MPP 138. The sender then sends the message through the TCP/IP network to MPP 138.

The Next MPP

As shown in FIG. 6 MPP 138 has an associated listener 136. Listener 136 receives the message sent by sender 122 through the TCP/IP network of the system. The listener reconstitutes the message and puts it in a queue for the MPP.

MPP 138 is configured to process the message received from MPP 108 in accordance with its associated state flow table records. The MPP processes the message based on the message type which can be determined from a message map table record which includes the INT_MSG_SID in field 4 of the SME, and the FMT_SID for the internal SME format.

MPP 138 includes a plurality of cell arrays like MPP 108. MPP 138 parses the incoming message and copies the fields into the cells and subfield cells of a first array. MPP 138 then carries out its state flow processes based on state flow table records corresponding to the MPP_SID for MPP 138 and the message type for the received message. The MPP then executes the state flow processes based on the table record for each state number, using the four cell arrays of the MPP in the manner similar to that previously discussed, to produce a resulting message. MPP 138 also sends records to the transaction record file in the database 32 in accordance with its configuration.

It should be noted that MPPs of the preferred form of the system use to advantage the conventions of the ISO 8583 Standard to minimize processing time. The ISO Standard includes bit maps for the 128 fields in the ISO message which indicate whether data is present in each field. While all 128 fields of the ISO message will preferably be present in field 12 of the SME, it is common to have no data in at least some of the 128 fields. In the preferred embodiment each MPP is operative to check the bit maps in the ISO message in field 12 of the SME so that only fields with data are copied into the corresponding cells of the first array of the MPP. This avoids copying zeros into the cell array.

In this example, MPP 138 is processing a message that will eventually be going to an external network. The message was generated in the SME format in MPP 108. The ultimate destination node of the external network was also determined by MPP 108. As a result, the number of state flow steps MPP 138 will likely need to take for processing a message of this type is limited.

MPP 138 will preferably send at least one transaction record entry to the database 32. The transaction record entry will preferably include the echo back data that can be used for tracking the message back to MPP 108 and eventually to terminal 68. However, if this was satisfactorily done by MPP 108 this step need not be included as part of the state flow configuration of the MPP for handling this type of message. The MPP 138 may also generate any extra data elements required by the external network.

MPP 138 builds a new message that includes the appropriate data in the fields of the SME. The MPP 138 preferably functions to have the NODE_SID of the external network placed as the target node value in field 6 of the header. As previously discussed, if the SERVICE_SID value in field 5 was used to route the message to MPP 138, this value may have been in field 6 of the message MPP 138 received. This will be accounted for in the configuration of the MPP 138 in handling the message.

Alternatively, when the message from MPP 108 to MPP 138 is passed through an intermediate timer node, the target node for the external network was preferably stored in a private field in the ISO message which is in field 12 of the SME. The MPP 138 may then include among its steps the recovery of this value from the subfield cell of its ISO array. MPP 138 then inserts this target node value into the header of the message it generates.

MPP 138 is configured to look for the target node sid of the external network in the messages it receives. This is accomplished responsive to the "data source" indicator in field 7 of the incoming message. If the message indicates that its source is an "internal source" (either as set by MPP 108 or by an intermediate timer) MPP 138 obtains the node value from the private field. If the message source was set to "external source" the MPP 138 will either use the target node in field 6 of the incoming message, or will derive the target node value in accordance with its configuration.

MPP 138 builds the fields of a new message in its final ISO cell array. This new message will include all 12 fields of the SME. For the message created by MPP 138 in this example, field 1 which is the header layout version will be the same as the incoming message.

Field 2 which is the source node sid will have the value corresponding to MPP 138. This is due to the fact that this node is the source of this new message.

Field 3 is the system time for the message. This is the time the new message is generated by MPP 138.

Field 4 is the internal message sid. This is the value for the message produced by MPP 108 which is in the SME format. MPP 138 will change this value to the INT_MSG_SID for the message in the format going to the external network. As this value was previously derived it may be moved out of a private field where it was stored by MPP 108 with the target node sid, and now placed in field 4 of the header. Alternatively, MPP 138 could again derive this value through a state flow process using the message map table records and the common message type value for the different message formats.

Field 5 is the SERVICE_SID of the MPP that will next process the message. Because in this example the message is heading out of the system to a network and not to an MPP, this value is null.

Field 6 is the ultimate target node sid value for the external network as previously discussed.

Field 7 is the data format indicator, which would indicate that the source of the data in the message is internal to the system.

Field 8 is the message direction. MPP 138 sets this value to "out". As later discussed setting the direction to out will cause a sender 140 which sends this message to derive the next system address in a different manner from that used when the message direction is sent to other values.

Field 9 is the elapsed processing time from receipt of the original message from terminal 68. MPP 138 adds its processing time to the value in this field in the message received from MPP 108.

Field 10 contains the node sid value for MPP 138 which is the last processing node.

Field 11 is not used in this example, because the original incoming message did not come from a terminal that is part of a line group. If it were used, the data from field 11 in the incoming message could be duplicated in the outgoing message. Alternatively, the line group data could be set to null. The original line group data for the incoming message could be stored with the messages in the transaction data file in the database along with the "echo back" data. This would enable recovery of this information when a responsive message is received from the external network.

The Sender to the Network

MPP 138 delivers its new message to a sender 140 as shown in FIG. 6. Because the sender 140 receives a message with the message direction set to "out" the sender derives the next system address based on the target node value in field 6 of the message.

Having the address of the ultimate system node corresponding to the external authorization system enables the sender 140 to find the system address of the next component which is an MGR. The path out of the system is logically derived and the message can be forwarded to the next processing node. Because the ultimate destination node is known for the message, the sender derives the address for the MGR that can next process the message by reviewing the "parent-child" relationships of nodes.

Figure 7:
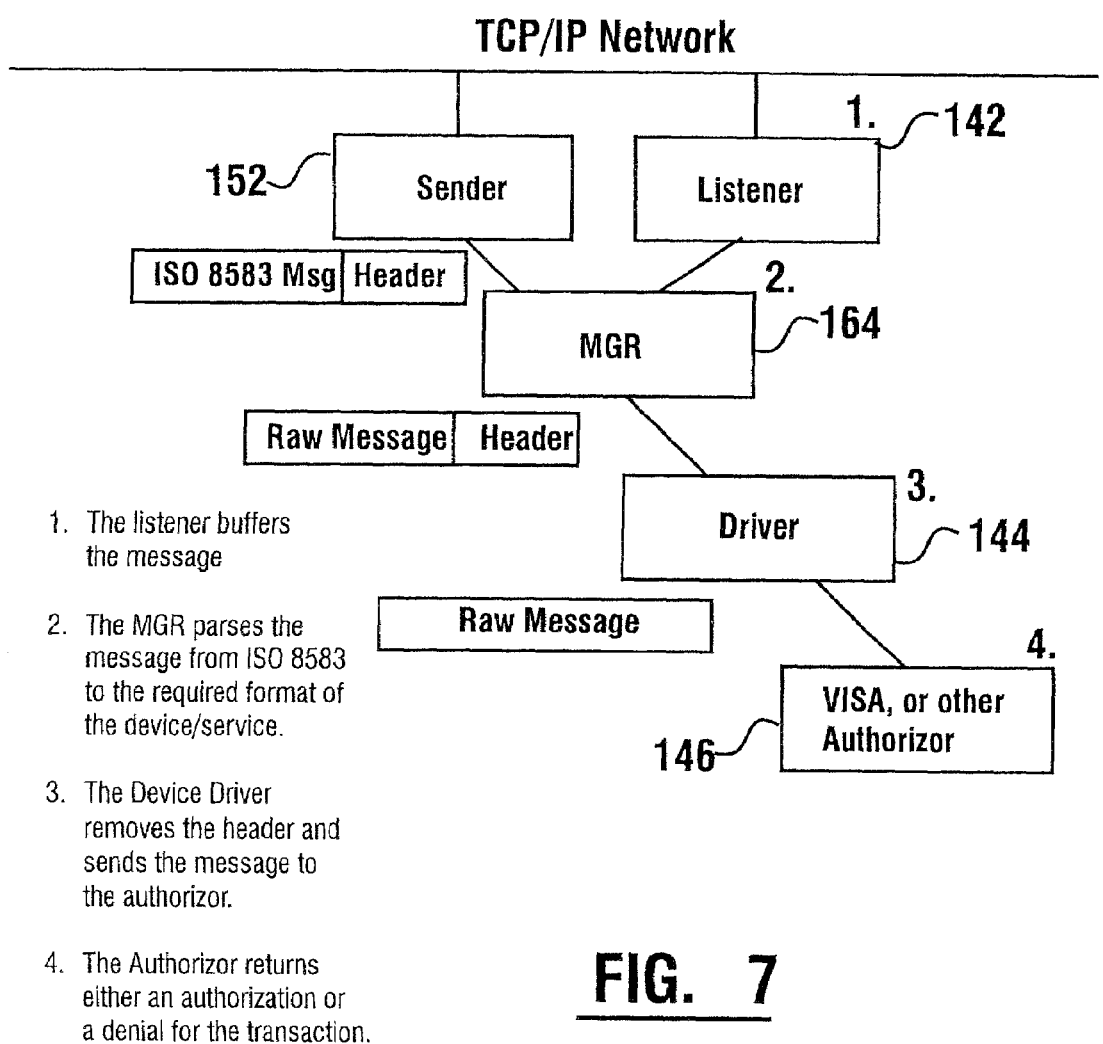
FIG. 7 is a schematic view showing how a transaction is further processed beyond the processing steps shown in FIG. 6 and is delivered to an external authorization system, network or other external system.

The node table record including the AUTH_NODE_SID value derived from the PAN prefix, is the ultimate target node which is authorizing network 146 shown in FIG. 7. Its node table record includes the NODE_SID value of its parent node, its parent node being its line driver 144. This is represented in partial node table record 156 in FIG. 30 as PARENT_NODE_SID. In this way a NODE_SID) value can be derived for the line driver which connects to the target node which is the external authorization network 146 in this example.

The node table record 158 for the NODE_SID of the line driver 144 of the external network includes in its node table, a parent NODE_SID value. The parent node of the line driver 144 is the node sid value of an MGR 164 which can convert the message delivered from the MPP 138 and put it in a suitable format for the external authorization system. The node table record for MGR 164 is indicated 160 in FIG. 30.

The sender 140 operates to derive the parent nodes of each system component above the ultimate target node until it reaches the node of the MGR 164, which does not have a specified parent in its node table record. Upon deriving the NODE_SID value of the MGR the system address of the MGR is derived by the sender; As shown in FIG. 30, the TCP/IP address for MGR 164 is determined from the SERVER_SID and IP_PORT_ID columns in record 160. The server table record 162 which includes the SERVER_SID value provides the IP address of the MGR. As a result the sender 140 of MPP 138 resolves the TCP/IP address of MGR 164 that will handle the outgoing message.

The sender 140 sends the message through the internal TCP/IP network to the address of MGR 164. MGR has a listener 142 that receives the message and reconstitutes it. The listener then places the message in a queue of the MGR. It should be understood that MGR 164 may reside on the same or a different computer from MPP 138.

The MGR 164 shown in FIG. 7 is similar to MGR 24 except that in this situation its operational steps are generally executed in reverse from those previously described with regard to MGR 24. This direction of the MGR processes is controlled by the "message direction" in field 8 of the SME header of the message it receives. It should be understood however that each MGR may process messages in either manner.

MGR 164 operating on this outgoing message first fills its MGR cell array with data from the internal ISO message. It then determines the manner in which to transform the internal message to change it to the format of the external authorization system 146. This format will likely differ from both the ISO 8583 format used within the system and the originating terminal message format.

MGR 164 uses the ISO field table records and ISO subfield table records represented in FIG. 23 to fill its cell array. The MGR uses the bit map data in the ISO message in field 12 of the SME message to determine the length of each field corresponding to each of the 128 fields where data may be present. This is done based on the table record corresponding to the SME format and the particular ISO_BIT_SID value. The MGR also fills its internal storage for holding the header data based upon the defined lengths of fields 1 through 11 of the SME.

The MGR 164 then converts the values from the SME values in its cell array and generates a new message in a buffer in the message format of authorization network 146. This is accomplished by taking the table records corresponding to the INT_MSG_SID value in the header. The MGR first sets its counter corresponding to the FIELD_NUM value to "1" and looks up the message field record corresponding to the INT_MSG_SID and field number 1. MGR 164 then finds the ISO_BIT_SID value in that table record. (See FIG. 22.)

The ISO_BIT_SID value tells which ISO bit, and therefore which cell, in the ISO cell array contains the data which will be placed in field number 1 of the outgoing message. The MGR 164 before copying the data in the first field of the buffer checks to see if the length of the ISO data in the cell and the field length in the external format are the same. This is determined from the ISO field table record corresponding to the ISO_BIT_SID value (and ISO format) the layout of which is shown in FIG. 23.

The MGR is configured to execute programmed procedures if the field length of the desired incoming and outgoing messages do not match, based on the different length sid values in the table records. The MGR then executes the appropriate procedures to modify the length of the data from the cell array to be inserted into field number 1 of the outgoing message before placing it in the buffer.

The MGR then increments the counter for the FIELD_NUM and repeats the process using the records corresponding to the INT_MSG_SID and new FIELD_NUM, as well as the table record corresponding to the SME format and the ISO bit value. In each case the MGR adjusts the field length if necessary as previously described before copying the message into the buffer. In some cases the format of the ISO cell data may need to be converted to a different value to be in the proper format for the network. This is done responsive to the data format values of the ISO and outgoing message table records. When necessary, the ISO data from a cell is converted and then copied into the next position in the buffer of the MGR.

In some cases the procedures used in the MGR to change the lengths of fields or to convert data between values, include the same steps whether the message direction through the MGR is out or in. This enables a corresponding procedure in the MGR configuration to be carried out in forward or reverse. In other situations separate programmed procedures are performed to change data which are specific for a message direction. These common programmed procedures are preferably available in every MGR in the system. However, when an unusual data conversion requirement is encountered it can often be better accommodated by processing within an MPP and storing the values in a defined format in the private fields of the ISO message. These values can then be placed in the outgoing message of the MGR based on SUBFIELD_SID values in the message field tables, and the corresponding ISO subfield table records. This approach enables the MGRs to be the same throughout the system.

After the new message is built the MGR 164 delivers the message with the header fields it received, to the driver 144 through the IPC. The appropriate driver is derived by the MGR as the parent node of the external network. The driver strips the internal header and then puts the needed protocol portions on the new raw message in accordance with the API of the particular external authorization system. The driver sends the message to the external authorizing network 146.

It should be understood that while in the foregoing examples one or two MPPs have been discussed, embodiments of the invention may process messages in several MPPs as a message passes through the system.

Figure 20:
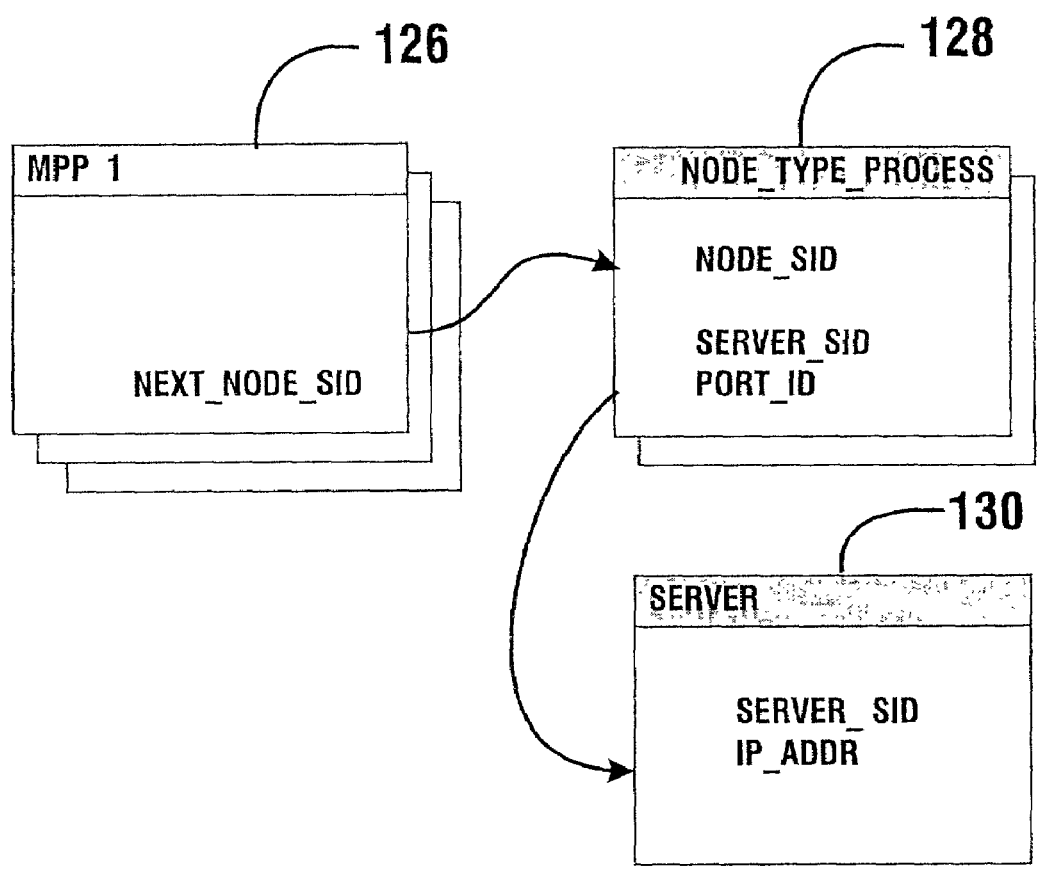
FIG. 20 is a schematic view showing a message processing program of the present invention sending a message to a next message processing program within the system.

In some cases instead of building a message for a system node for an external network it is necessary to resolve an address for a next MPP in the system. This is schematically shown in FIG. 20. The processes executed by the MPP currently processing the message refers to values in table records 126 which produce a NODE_SID of a next node. When the MPP is building its new message the MPP inserts that next MPP node sid in the header of the message as the target node sid. The MPP then updates the header and sets the message direction to "in" and forwards the message to its sender.

The sender in this example acts responsive to the "in" message direction and determines the address to send the message by looking up the corresponding NODE_SID table record 128 for the target node. This table record provides a SERVER_SID and a PORT_ID. The SERVER_SID is used to determine a server table record 130 which provides the IP_ADDR value. This provides the system address for the next MPP to process the message.

The processing and generation of messages continues in accordance with the configuration of the MPPs in the system. Generally the processing ends with a message passing out of the system to an external device such as a network or terminal. However, in some embodiments processing may end without generation of an outgoing message.

Return Message from External Network

In the transaction example described so far the system of the invention has received a message from POS terminal 68. The system has transformed the message from the external terminal format to the internal format of the system in MGR 81. The system processed the incoming message in MPP 108 to generate a new message. The new message was processed in MPP 138 to generate a further new message to the external network. The message from MPP 138 was transformed by MGR 164 into an external format for the external network 146 and the message has been sent.

Generally the authorizing network 146 will respond to the message it received. This responsive message will be processed by the system of the invention and a new message will be sent to terminal 68.

Figure 8:
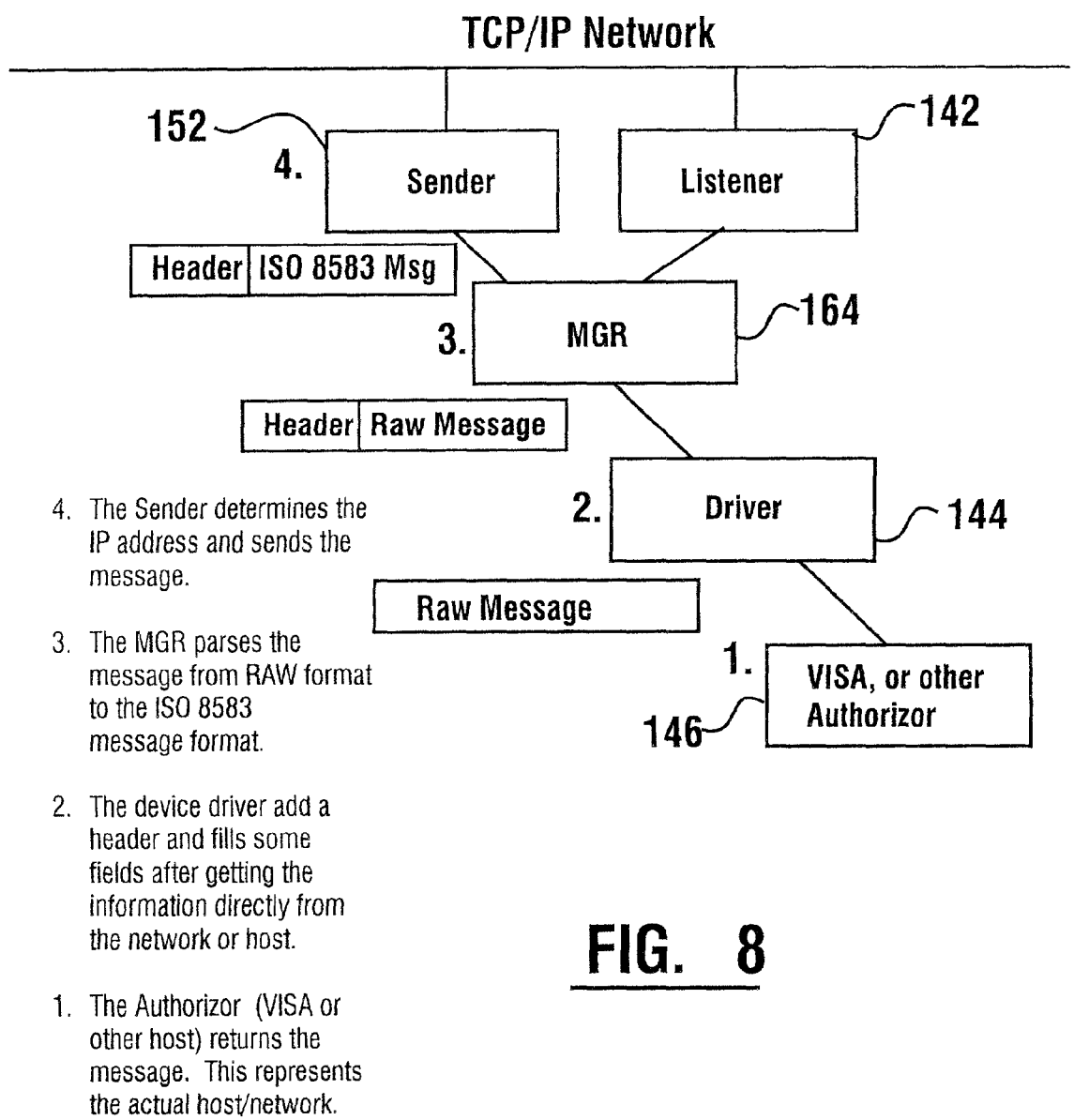
FIG. 8 is a schematic view that shows a message being received from an external authorization system or other external network by the system of the present invention.
Figure 10:
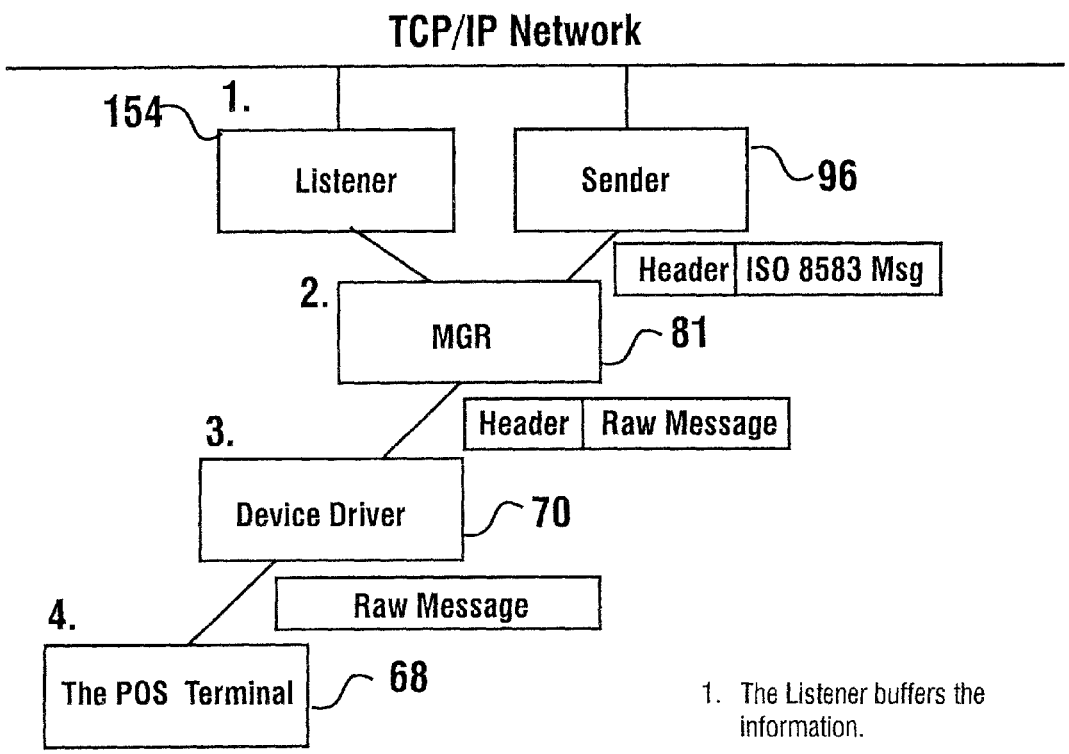
FIG. 10 is a schematic view showing processing of the message within the financial transaction processing system of the invention and delivering the message to a terminal device.

The path of a return message coming from external network 146 is shown schematically in FIG. 8. The message is an incoming message to the system and the steps carried out during its initial processing are similar to that described previously for the incoming message from the terminal 68 in FIG. 11.

The driver 144 strips the protocol dependent portions of the message. It adds the SME header fields 1 through 11 and puts the raw message in field 12. It sets the message type, message direction, message receive time and data format indicators in the header. Field 11 is used if appropriate.

The ARP portion of the driver 144 resolves the NODE_SID record value for the external network 146 based on the physical address. The driver inputs the NODE_SID value for the external network in the header as the originating node and sends the message through the IPC to MGR 164.

MGR 164 derives the message type for the incoming message. This is accomplished based on the value in the message format column for incoming messages in the node table record corresponding to the external network 146. The message format value is used to find a message format table record which gives the offset and length information, which indicates where to find the "message type" value in the raw message. The MGR finds the message type value, and finds a message map table record which includes the message format value and message type value which provides an INT_MSG_SID value for this incoming message. (See FIG. 22.)

The MGR 164 then converts the raw message to the internal ISO format one field at a time. This is done using the Message Field, Field Switch and Field Map table records for the INT_MSG_SID value, as well as the ISO table records for each ISO bit. The MGR also converts and transforms data from the original format to the ISO format based on differences between the message fields in the raw and ISO formats, and the MGR's programmed procedures for dealing with such differences.

The MGR holds the message it receives from the driver in a buffer. This message is in the SME format with the raw message from the external network in field 12. The MGR transforms this message to the internal ISO format by parsing the message and placing it in the cells of its ISO array. As the MGR handles each field of the raw message it converts the raw message field value into an ISO field value, if necessary, and copies the new value in its cell array in the proper location corresponding to the ISO message format.

The MGR 164 then resolves the system address for sending the message. The message router table record corresponding to NODE_SID of the external network 146 and the INT_MSG_SID of the message, provides a SERVICE_SID value. The service provider table record with the SERVICE_SID value provides the NODE_SID for an MPP that can process this message. (See FIG. 29.) The MGR puts this NODE_SID value in the header as the target node and updates the other header values.

A sender 152 of the MGR responds to the "in" message direction in field 8 of the header to find the system address of the MPP that can process the message. This is done using values in node table record for the MPP and the server table records in the manner previously discussed. Sender 152 sends the message to that MPP through the TCP/IP network.

The MPP to which messages from the external network 146 are routed by the MGR 164 will preferably be MPP 138. This is because MPP 138 is the MPP that deals with messages in the format of that external network. As shown by the state flow table record layouts in FIG. 25, the MPPs of the preferred embodiment of the invention include table records which correspond to a plurality of message types. Of course for each message type there are generally a plurality state numbers which direct state flow processes for generating the field values of a new message.

The responsive message from external network 146 preferably includes the data in the "echo back" fields from the message it received in accordance with the rules of the network. This data is placed in the "echo back" fields in the ISO message of the SME in accordance with the table records used by the MGR 164 to transform the message.

The MPP 138 is configured to process the message and generate a new message based on the message type. In this situation the message type coming from the network is designated a response to a prior message. This is indicated by the message type value in the field of the ISO message which is defined as holding the message type designator. The ISO message with this message type field is in field 12 of the SME.

MPP 138 is configured to carry out state flow processes in response to receiving a return type message. Part of this configuration is to use the values in the "echo back" fields of the ISO message to route its new message back to the MPP 108 that is to receive the response. MPP 138 receives the data from the TCP/IP network through its listener 136 which places it in a queue to the MPP. The MPP then places the message data in its first cell array. The MPP then operates to take the "echo back" data to its transaction record file in database 32. Upon finding a match of the echo back data in a message stored as a transaction record, it retrieves the message from the transaction record file. This record preferably includes NODE_SID and/or SERVICE_SID values for MPP 108. The MPPs in the system which receive response messages have the capability of recovering the data from the data store that can be used to direct the message to the appropriate system component.

MPP 138 carries out its state flow process in response to the message type from the external message to generate the new message to MPP 108. MPP 138 moves data in its ISO cell arrays to build a new message and a new message header. In some cases the processing required for the particular message type is minimal. For some responsive messages MPP 138 need only copy the message from the MGR and place and a new address in the header. The new header has updated information for the message being sent to MPP 108. MPP 138 can send the message based on the NODE_SID value for MPP 108 as the target node value in the header and an "in" message direction, or alternatively it can send the message to MPP 108 based on placing the SERVICE_SID value for MPP 108 in the header and an "MPP to MPP" message direction. This is a matter of choice for the operator of the system.

It is preferable for external authorization systems to provide "echo back" data in responsive messages so that such messages can be matched to initiating messages. However, it is possible to encounter situations where no echo back data is provided. If no echo back data is available then an MPP may be configured to create transaction records in the database for an outgoing message that can be correlated with a later incoming message. This may be done by including time values or other values in the messages stored as transaction records. This would enable the MPP receiving a message from the external system to recover the record concerning the most recent or otherwise outgoing message. Alternatively, the MPP itself may be configured to correlate the last message it sent with the next returning message. The correlation approach taken will depend on the particular system that is sending and receiving messages.

It is an advantage of the system of the preferred embodiment that it can be used to process messages that pass to and from various types of external systems, including systems that do not provide "echo back" data. It is a further advantage that connection to such a system does not inhibit the processing of other messages by the system.

Continuing with the example in which a response message is going back to terminal 68, the MPP 138 has built the fields of a new message in its final cell array. The MPP generates the new message in the SME format. MPP 138 delivers the new message to its sender 140. Sender 140 derives the system address based on the message direction and corresponding SERVICE_SID or TARGET_NODE value in the header. The sender sends the message to MPP 108 through the TCP/IP network.

The MPP 108 receives the message at its listener 110. The listener reassembles the message and puts it in a queue to the MPP. The MPP 108 is configured to deal with messages in the format of messages exchanged with terminal 68. It operates to place the incoming message in its first cell array and to build a new message based on its state flow processes for the particular message type.

MPP 108 operates to take the "echo back" data to its transaction record file in the database 32. Upon finding a match for this data in one of its transaction records it retrieves the message. This message includes the NODE_SID for the terminal 68. The recovered message would also include the field 11 data for the line group, if applicable.

The new message built by the MPP 108 will include an updated header for the message it will send to terminal 68. This header will preferably include placing the NODE_SID value for the terminal 68 as the target sid node value. MPP 108 will also set the message direction to "out". The internal message sid value will be set to that corresponding to the message format in which the resulting message will be sent to terminal 68. This value is derived through a state flow process in MPP 108. The INT_MSG_SID is preferably derived using the OUT_MSG_FMT value from the node table record corresponding to terminal 68 and the message type built by MPP 108. From the message map table records the INT_MSG_SID value for the outgoing message is derived.

The MPP 108 sends its resulting message to its sender 122. Sender 122 derives the system address of MGR 81 based on the "out" message direction and the "parent-child" relationships between the terminal, its driver and the MGR. The first "parent-child" relationship is found in the node table record for the terminal 68 which is the TARGET_NODE_SID, and its line driver 70. The "parent-child" relationship in the node table record for line driver 70 indicates that MGR 81 is the parent node of the line driver. This enables the sender 122 to derive the NODE_SID for the MGR. The sender derives the IP_PORT_ID and IP_ADDR values for MGR 81 and sends the message to the MGR through the TCP/IP network.

A listener 166 of MGR 81 picks up the message from MPP 108 and puts it in a queue to the MGR. The MGR translates the message to the format for terminal 68 based on the ISO table records and table records for the INT_MSG_SID value associated with the outgoing message. In processing the outbound message the MGR places the message it receives in the SME format in its cell array. The outgoing message is built from cell data one field at a time, in a buffer in MGR 81. Data values from the cell array which holds the ISO message in MGR 81, are converted and transformed through programmed procedures in the MGR in the manner previously described.

The outgoing message is sent from MGR 81 to line driver 70. The line driver strips the SME header and adds the protocol information for the terminal. The driver 70 delivers the outgoing message to the terminal 68. The system is now ready to receive another message from terminal 68.

As can be appreciated from the foregoing description, many messages may move simultaneously between the components of the system in the TCP/IP network. The various MPPs and MGRs in the system are each processing messages independent of one another. This provides for rapid processing of messages. The preferred form of the system further provides for duplicate processes to run on computers at different locations. The preferred form of the system is structured so that messages can be processed at alternative system addresses where a similar software process is running if the first priority process address is not available.

The preferred form of the system includes a program which starts the system and loads the table records into shared memory of the computer which is being started. This program starts all node type processes having the SERVER_SID value of the computer being started. These processes which include the shared memory manager 58, MPPs and MGRs are started and their table records loaded from the database into shared memory. The start up program then causes other system components that have a "child" node relationship with these node type process components to be started and their corresponding node table records loaded into the shared memory. Each layer of components starts the components that are its "children" until all the node types on the server are available and their node table records are available in shared memory.

The Timer

As can be appreciated from the transaction processing example, the processing of transactions in the system of the preferred form of the present invention is asynchronous. This enables system components to proceed with the processing of further transactions rather than waiting for a response message to each outgoing message. This increases transaction throughput for the system. However, it also does not provide any inherent indication that one of the messages sent out by the system has been lost or was not responded to.

To provide assurance of proper responses to messages the preferred embodiment of the invention includes a timer component for alerting the system of a past message that went unresponded to. The alerting message from the timer is sent to the MPP that originated the message that was not responded to, and the MPP acts in accordance with its configuration to take steps to indicate a problem to the terminal that originated the transaction, or takes other corrective action in accordance with its configuration.

Figure 28:
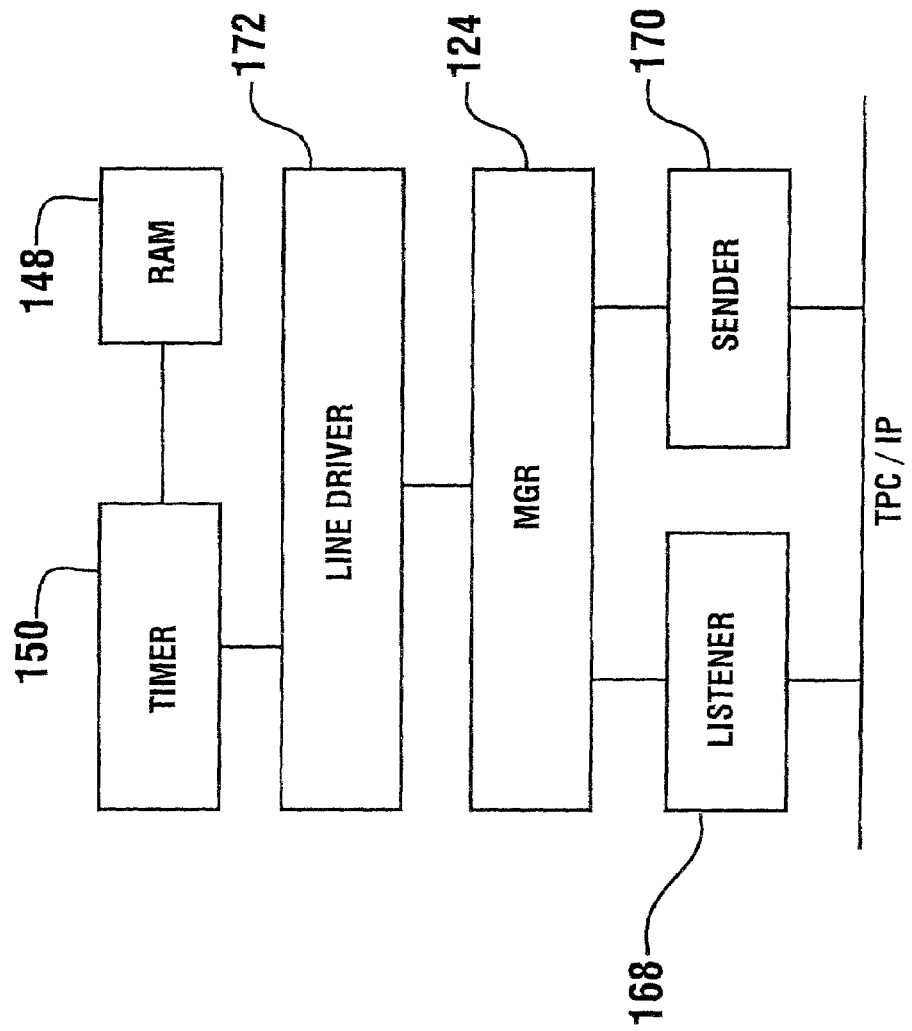

Although timers may be used for tracking responses to various messages in the system, an example of the use of a timer is discussed in connection with the sample financial transaction previously described. As shown in FIG. 28 a timer 150 in this example is a software process that runs in a computer but is configured in the system like an external terminal device. As such it has a corresponding node type term table record. The timer 150 is connected to the TCP/IP network by a line driver 172 software process. The line driver is connected to an MGR 124, which is similar to other MGRs. The line driver 172 and MGR 124 have corresponding node table records. The MGR 124 has a listener 168 and a sender 170, like listeners and senders for other system components.

In the transaction example, the message going from MPP 108 to MPP 138 would be passed through the timer 150. This is accomplished by MPP 108, after deriving the system address for MPP 138, executing further state flows in accordance with its configuration. This processing places the NODE_SID for MPP 138 (or the SERVICE_SID value for MPP 138 if that approach is used) and the INT_MSG_SID value, in a selected ISO private field in field 12 of the message. The MPP 108 also resolves and puts a time for response to the message in a private field in the ISO message. MPP 108 also puts its own NODE_SID value in a private field. The MPP 108 then puts the NODE_SID for the timer 150 in field 6 of the header and sets the message direction to "out". MPP 108 then sends the message through the TCP/IP network to the timer.

The sender 122 of the MPP 108 responds to the message direction set to "out" to derive the system address of MGR 124 based on the "parent-child" relationships of the line driver 172 to the timer 150, and the MGR 124 to the line driver 172, respectively. This is done by sender 122 in the manner previously discussed using the node table records. The sender 122 then determines IP_PORT_ID and IP_ADDRESS value for the MGR 124 and sends the message through the TCP/IP network.

Listener 168 receives the message and puts it in queue for MGR 124. The timer accepts messages in the SME ISO format so the MGR 124 operates only to copy the message fields from its cell array to its buffer without converting or transforming the field data.

The MGR 124 passes the message to the line driver which strips the header and sends the ISO message to the timer 150. The timer processes and stores a modified version of the original ISO message in its queue in designated RAM 148. The stored message includes the "echo back" data as well as the NODE_SID value of MPP 108 which originated the message. The timer is configured to take the time out of the private field and uses it as a trigger to produce a message back to MPP 108 if the message is not deleted from the timer queue prior to that time. The timer also modifies the message so that it includes an indicator in a selected private field that it is a "time out" message. The timer also places the NODE_SID value for MPP 108 in the header before storing the message in its queue.

After the timer 150 stores the time out message, the timer preferably takes the original message it received and moves the NODE_SID for MPP 138 (or SERVICE_SID if that approach is used) and the INT_MSG_SID out of the private field. The timer places these values in the appropriate fields in the header to send the message to MPP 138. The timer also changes the message direction in the header to the value appropriate to route to MPP 138. The timer then sends the message to the line driver. The line driver derives a NODE_SID value of the timer which shows that the incoming message is in the internal ISO SME format. The line driver responds to the fact that the incoming message is already in the internal format to pass it to the MGR 124.

MGR 124 operates responsive to the IN_MSG_FMT_SID presence of the message which indicates that it is already in the SME format of the system. As no reformatting of the message is required, the MGR 124 copies the message it received from the timer and delivers it to its sender 170. Sender 170 transmits the message through the internal TCP/IP network to MPP 138 in accordance with the header data on the message.

The responsive message from network 146 is routed back to MPP 138 in the manner previously described. MPP 138 uses the "echo back" data to route the message back to MPP 108 and to terminal 68. MPP 108 executes state flow processes which update its transaction records in the database 32. The MPP 108 also includes a state flow process that is performed responsive to finding the corresponding outgoing message to a new incoming message. This state flow process in MPP 108 generates a message to the timer 150 to delete the transaction in its queue having corresponding data in the selected private field. If this message is received by the timer 150 before the time set in the timer expires, the original message data is deleted from its queue. The message sent by MPP 108 to the timer 150 includes an indicator in a private field in the ISO message that it is a "delete" message.

The timer 150 processes the delete message by matching the private field data in the delete message with a message in its queue. Upon finding a match the timer deletes the message and cancels the stored message. Nothing happens when the time originally set runs out.

If however, the time set in conjunction with a message in the queue of timer 150 expires before a delete message is received, the timer operates to send a "time out" message back to MPP 108. The timer delivers the message to the line driver 172. The line driver responds to the INT_MSG_SID corresponding to the SME ISO format to pass the message without reformatting to MGR 124. The MGR likewise responds to the message already being in the internal system format to copy and pass the message to its sender without reformatting the message. Sender 170 sends the message through the internal TCP/IP network to MPP 108.

MPP 108 upon receiving this message treats it like other messages to process it in accordance with its message type. MPP 108 is preferably configured to look for "time out" indicators in a field in the ISO message in response to field 7 of the message header indicating that the message has come from an internal data format source. The MPP 108 goes to the private field to see if the message is an internal time out message, and then further operates in accordance with its state flow processes for processing an internal "time out" message. This may include sending a message back to terminal 68 based on the "echo back" data to indicate a problem has occurred. It may alternatively or additionally involve some other processing such as sending a message to APMS 62 to indicate the occurrence of a problem. As used herein processing includes taking some step in response to a message.

Encryption and Other Devices

In embodiments of the system, hardware or software encryption devices may be needed to decrypt incoming messages as well as to encrypt outgoing messages. In addition, if the components of the system are widely geographically distributed, there may be a need for encryption of messages in the TCP/IP network which connects the system components. This is done in accordance with the rules specified for the particular encryption components used.

Figure 27:
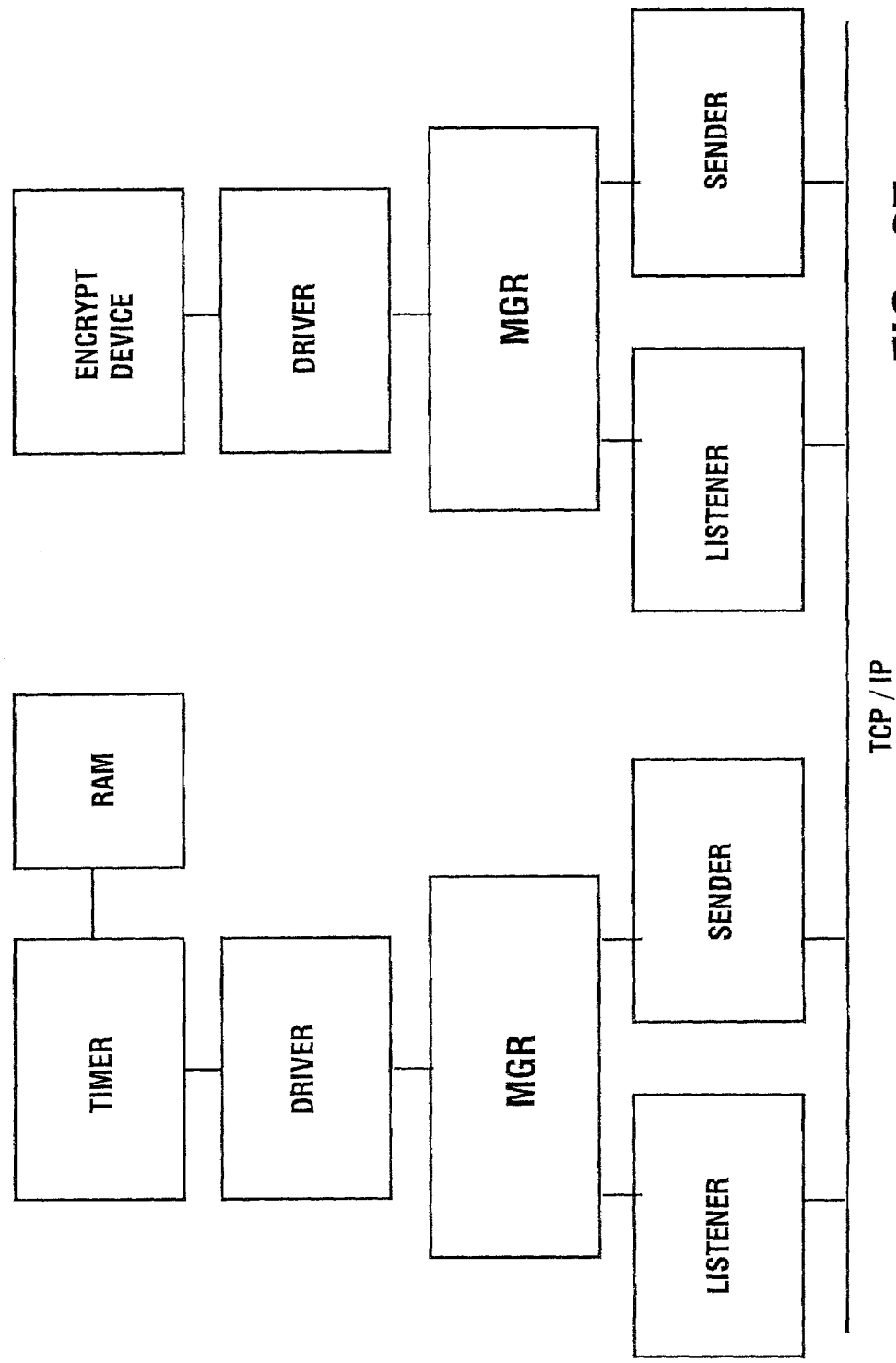
FIG. 27 is a schematic view showing the operation of the message gateway router of the financial transaction processing system of the present invention in connection with a device used for encryption and decryption of transaction messages going to and from the financial transaction processing system.

As indicated schematically in FIGS. 9 and 27 an encryption/decryption component can be treated as a node type terminal. As such it will have corresponding node table records defining its operational parameters. Other system nodes, such as a node type terminal table record associated with an external network, or a node type process table record for an MPP, may include "key" parameters. These keys are used by the encryption device to encrypt and decrypt data in the ISO portion of the internal SME format message in field 12. Such key parameters are represented by the entries in columns 30–37 of node table portion 82 in FIG. 21.

An MPP may be configured to route messages through an encryption device in the internal TCP/IP network. An MPP may in addition be configured to generate messages that deliver key data to the encryption device, or to include key data with messages as required by the message format used by the encryption device.

New types of external devices (including external networks) which send and receive messages can be connected to the system of the present invention. This is done by configuring node table records with the characteristics of the device. Accommodating such a new device requires configuring one (or more) MPPs to handle messages to and from the new device. This process is generally much simpler than what is required to accommodate connection of new devices or systems to conventional financial transaction processing systems.

The preferred embodiment of the system includes diagnostic features which provide information concerning the operation of system components. As graphically represented in FIG. 21, system nodes have an associated view window which is configured to provide operating information for the system node through the graphical user interface. A user is enabled to select the desired node with an input device and view the displayed parameters during system operation. This facilitates identifying the cause of difficulties.

A further fundamental advantage of the system of the invention is that it operates using uniform systematic processes for handling incoming and outgoing messages. This enables repeated reuse of the stored system information for converting between message formats and for carrying out transaction processing. This reduces the amount of effort required to add features and functions to the system and minimizes the need for extensive custom developments commonly associated with prior art systems.

The system also provides distributed processing which enables the same functions to be carried out in different locations and on different computers in the system. As a result, if one location is down, another can take over. The system includes in its database record tables of system addresses where the functions can be carried out as well as priority as to which is to be employed first. This increases system reliability.

Thus, the new financial transaction processing system and method of the exemplary form of the present invention achieves the above stated objectives; eliminates difficulties in the use of prior devices, systems and methods; solves problems; and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description performing the recited function or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A system for processing financial transactions comprising:
    a database including data concerning transaction message formats, wherein the database includes stored information concerning transformation of messages between at least one internal message format and a plurality of external message formats including at least one external message format for communicating with an Automated Teller Machine (ATM); and
    a computer in operative connection with the database, wherein the computer includes a message gateway router software function (MGR), wherein the MGR is operative to determine a format of a received message, the received message having either the internal format or one of the external formats and a message direction indicator associated with the message, the message direction indicator being indicative of either an incoming message direction or an outgoing message direction, wherein the MGR is operative responsive to the message direction indicator being indicative of the outgoing message direction to transform the message selectively from the internal format to any one of the plurality of external formats, and wherein the MGR is operative responsive to the message direction indicator being indicative of the incoming message direction to transform the message from any one of the plurality of external formats to the internal formal.

2. The system according to claim 1 and further comprising a plurality of external devices including at least one ATM, wherein each external device is in operative connection with the computer and communicates with the computer through messages in one of the external formats, and wherein the database further includes data representative of each external device and an external format used to communicate with the device, and wherein the MGR is operative responsive to the stored data to convert a message received from the device from the external format associated with the device to the internal format, and to convert a message to the device from the internal format to the external format.

3. The system according to claim 2 wherein the database includes data representative of an identity for each device, wherein the identity data is stored in correlated relation with the external format data, and wherein the MGR is operative to transform the message responsive to the identity data associated with a device sending or receiving the message.

4. The system according to claim 2 wherein the database includes data representative of message types for each of the internal and external formats, and wherein the MGR is operative to transform the message responsive to the message type data associated with the message.

5. The system according to claim 2 wherein said database includes data representative of offset and length information for each of the internal and external formats, and wherein the offset and length information defines a location of data representative of a message type in each of said formats, and wherein the MGR is operative to transform the message responsive to the data representative of the message type.

6. The system according to claim 4 wherein the database includes data representative of a message identifier value, wherein each message identifier value is associated with one message format and one message type, and wherein the MGR is operative to transform the message responsive to the message identifier value associated with the message.

7. A system for processing financial transactions comprising:
    a computer in operative connection with a database means for storing data representative of information for transforming messages between at least one internal message format and a plurality of external message formats including at least one external message format for communicating with an Automated Teller Machine (ATM), and wherein the computer is operative to set a message direction corresponding to each message processed by the computer, wherein the message direction is indicative of whether a corresponding message is in the internal message format or one of the external message formats;
    a transforming means in operative connection with the computer for transforming messages between the external formats and the internal format responsive to the message direction corresponding with each respective message and the information stored in the database means;
    a plurality of external devices including at least one ATM, each external device being in operative connection with the computer and operative to send and receive messages; and
    processing means operating in the computer wherein the processing means is operative to send and receive messages in the internal format, and wherein the processing means is operative to communicate with the external devices by passing messages through the transforming means.

8. The system according to claim 7 and further comprising a timing means for timing an elapsed time since a message was transmitted without a response, and wherein the timing means is operative to send a timing response message when the time has passed without the response being received.

9. The system according to claim 7 wherein the plurality of external devices include a plurality of financial transaction terminals, and wherein at least one of the plurality of external devices includes a financial transaction authorization system.

10. The system according to claim 9 wherein the computer is operative to transform messages in a plurality of external message formats communicated by the plurality of terminals, to corresponding messages in the internal message format, and the corresponding messages in the internal message format to corresponding messages in an external message format communicated by the financial transaction authorization system.

11. The system according to claim 7 wherein the plurality of external devices include a plurality of financial transaction terminals and a plurality of financial transaction authorization systems.

12. The system according to claim 11 wherein the computer is operative to transform messages in a plurality of external message formats communicated by the plurality of terminals to corresponding messages in the internal message format, and the corresponding messages in the internal format to a plurality of external message formats communicated by the plurality of financial transaction authorization systems.

13. A system processing transaction messages comprising:
   a database including stored information concerning transformation of messages between at least one internal message format and a plurality of external message formats including at least one external message format for communicating with an Automated Teller Machine (ATM); and
   a computer in operative connection with the database, wherein the computer includes at least one message transformation software component, wherein the message transformation software component is operative to cause the computer to determine a format of a first message, wherein the first message has either the at least one internal message format or one of the plurality of external message formats, and wherein the first message has a message direction indicator associated therewith and wherein the message transformation software component is operative to cause the computer to transform the first message responsive to the determined format and the message direction indicator associated therewith, wherein the first message having an external format is transformed to an internal format message corresponding to the first message, and wherein the first message having an internal message format is selectively transformed to an external format message corresponding to the first message.

14. A method for processing transaction messages in a system including at least one computer in operative connection with a data store, comprising the steps of:
   storing in a data store, data concerning at least one internal message format and a plurality of external message formats including at least one external message format for communicating with an Automated Teller Machine (ATM);
   determining a format of a message with the computer responsive to the information stored in the data store; and
   associating with the message a message direction indicator;
   transforming the message responsive to at least one message transformation software component operating in the computer responsive to the message direction indicator, the determined format and the data in the data store, wherein the message is transformed from the one external format to the internal format responsive to the determined format corresponding to one of the external formats, and wherein the message is transformed selectively to any one of the plurality of external formats responsive to the determined format corresponding to the internal format.

15. The method according to claim 14 wherein the storing step further comprises storing in the data store, data concerning a plurality of external devices, and for each external device, data corresponding to a system address and an external message format used in communicating with the device.

16. The method according to claim 15 wherein in the storing step the plurality of external devices include a plurality of financial transaction terminals and at least one financial transaction authorization system.

17. The method according to claim 16 wherein in the storing step the plurality of external devices include a plurality of financial transaction authorization systems.

18. The method according to claim 17 wherein the plurality of financial transaction authorization systems communicate messages in a plurality of external message formats, wherein the storing step includes storing in the data store, data corresponding to the external message formats used in communicating with each of the financial transaction authorization systems.

19. The method according to claim 15 wherein in the determining step, the message is an external format message from an external device, and wherein the format is determined responsive to a system address corresponding to the external device that is stored in the data store.

20. The method according to claim 15 wherein in the determining step the message is determined to be an internal format message, and wherein in the transforming step the message is transformed to an external message format responsive to a system address corresponding in the data store to an external device to which the message is being directed.

21. Computer readable media bearing instructions which are operative to cause a computer to carry out the method steps recited in claim 14.

22. A method for processing messages generated by a plurality of devices including at least one Automated Teller Machine (ATM), each of the devices communicating messages in a different device message format, wherein the plurality of devices include a plurality of types of external devices, wherein each type of external device communicates in a corresponding external message format, the processing conducted with a computer in operative connection with a data store, comprising the steps of:
   storing in the data store, data representative of each of the devices operatively connected to provide messages to the system, and storing for each of the devices, data representative of a device message format in which each device communicates at least one device message;
   storing in the data store, data representative of how to produce responsive to each device message in a device message format, a corresponding message in a second message format, wherein the second message format includes an internal message format;
   storing in the data store, data representative of how to process messages in the second message format;
   receiving device messages with the computer from the devices including at least one ATM;
   producing responsive to the device messages, corresponding messages in the second message format through operation of the computer responsive to data stored in the data store, including the computer transforming the external format messages to internal format messages; and processing with the computer the messages in the second message format responsive to data stored in the data store.

23. A system comprising:
a plurality of first external devices, including at least one Automated Teller Machine (ATM), the plurality of first external devices communicating first messages in a plurality of first message formats;
at least one second external device, the at least one second external device communicating second messages in at least one second message format;
at least one computer in operative connection with the plurality of first external devices and the at least one second external device;
wherein the at least one computer is in operative connection with data in at least one data store usable by the at least one computer to convert messages in each of the plurality of first message formats and the second message format to an internal message format, wherein the computer is operative to communicate messages between the plurality of first external devices and the at least one second external device by transforming messages in the plurality of first message formats and second message format to the internal message format, wherein the at least one computer is operative to cause to be associated with each message, a message direction indicator, and wherein the at least one computer is operative responsive to a message direction indicator associated with a message, to cause the message to be converted between the internal message format and one of (i) the first message formats and (ii) the second message format.

24. The system according to claim 23 wherein the plurality of first external devices include a plurality of financial transaction terminals.

25. The system according to claim 24 wherein the at least one second external device includes a financial transaction authorization system.

26. The method according to claim 23 wherein the at least one data store includes system address data including a system address for each of the plurality of first external devices and the at least one second external device, and wherein the at least one computer is operative to convert each message which is in either the first or the second message formats to a corresponding message in the internal message format responsive to a system address associated with a first or second external device which generated the particular message.

27. The system according to claim 23 wherein the at least one data store includes system address data including a system address for each of the plurality of first external devices and the at least one second external device, and wherein the at least one computer is operative to convert each message which is in the internal message format to a corresponding message in either the first or the second message format responsive to a system address associated with a first or a second external device to which the particular message is being directed by the computer.

28. A method comprising:
(a) storing in at least one data store, data usable by a computer to accomplish conversion of messages in a plurality of first external message formats in which a plurality of first terminals adapted to carry out financial transactions including at least one Automated Teller Machine (ATM) communicate, and at least one second external format in which at least one financial transaction authorization system communicates, to corresponding messages in an internal message format;
(b) operating at least one computer responsive to the data stored in the at least one data store to communicate messages between the plurality of first terminals and the at least one financial transaction authorization system, wherein the at least one computer is operative to associate with each of a plurality of incoming messages to the at least one computer generated by the plurality of first terminals and the at least one transaction authorization system, a message direction indicator.

29. The method according to claim 28 wherein in step (b) the computer is operative to convert each incoming message to a corresponding internal message responsive to the message direction indicator associated with the particular incoming message.

30. The method according to claim 29 wherein step (a) includes storing for each of the plurality of terminals and for the at least one authorization system, data corresponding to an external message format and a system address, and wherein in step (b) the computer is operative to convert each incoming message responsive to both the message direction indicator associated with the particular incoming message and the corresponding system address data corresponding to the particular terminal or authorization system generating the message.

31. The method according to claim 28 wherein step (a) includes storing for each of the plurality of terminals and for the at least one authorization system, data corresponding to an external message format and a system address, and wherein in step (b) the computer is operative to convert each of a plurality of incoming messages generated by the terminals and the at least one authorization system, to a corresponding internal message responsive to the system address data corresponding to the terminal or authorization system generating the particular incoming message.

32. In a system including:
a plurality of authorization systems communicating through authorization system messages in a plurality of authorization system message formats;
a plurality of terminal devices including at least one Automated Teller Machine (ATM), communicating terminal messages in a plurality of terminal message formats;
at least one computer in operative connection with the plurality of authorization systems and the plurality of terminal devices;
at least one data store in operative connection with the at least one computer, the data store including data usable to transform the plurality of authorization message formats and the plurality of terminal message formats;
computer software adapted to operate in the at least one computer comprising:
at least one software component operative responsive to the data stored in the data store to cause the at least one computer to transform at least a portion of terminal messages in the plurality of terminal message formats to corresponding messages in an internal message format, wherein the plurality of terminal messages generated by the plurality of terminal devices each have associated therewith through operation of the computer software an incoming message direction indicator, and wherein the at least one software component is operative to cause at least the portion of each of the plurality of terminal messages generated by the terminal devices to be transformed to a corresponding message in the internal message format responsive to the incoming message direction indicator associated with the respective message.

33. The system according to claim 32 wherein the computer software further includes at least one software component operative responsive to the data stored in the data store, to cause the at least one computer to transform at least a portion of authorization system messages in the plurality of authorization system message formats to corresponding messages in the internal message format.

34. The system according to claim 32 wherein the at least one software component is operative to cause the computer to include the incoming message direction indicator in each of the plurality of terminal messages portions to be transformed.

35. A system according to claim 32 wherein a plurality of messages in the internal message format directed to the plurality of terminal devices have associated therewith by the software an outgoing message direction indicator, and wherein the at least one software component is operative to cause the plurality of internal format messages directed to the terminal devices to be converted to the plurality of terminal message formats responsive to the associated outgoing direction indicator.

36. A system for processing financial transactions comprising:
at least one database including data concerning transaction message formats, wherein the at least one database includes stored transformation information concerning transformation of messages from at least one internal message format to a plurality of external message formats including at least one external message format for communicating with an Automated Teller Machine (ATM), and from the plurality of external message formats to the at least one internal message format; and
a computer in operative connection with the at least one database, wherein the computer includes at least one software function operative responsive to the transaction message format data to determine a format of a received message, the received message having either the at least one internal message format or one of the plurality of external message formats and a message direction indicator associated with the received message, wherein the message direction indicator is indicative of either an incoming message direction or an outgoing message direction, and wherein the at least one software function is operative responsive to the stored transformation information and the message direction indicator being indicative of the outgoing message direction, to transform the received message selectively from the at least one internal message format to any one of the plurality of external message formats, and wherein the at least one software function is operative responsive to the stored transformation information and the message direction indicator being indicative of the incoming message direction, to transform the received message from any one of the plurality of external message formats to the at least one internal message format.

* * * * *